United States Patent
Ikeda

(10) Patent No.: US 6,434,478 B1
(45) Date of Patent: Aug. 13, 2002

(54) SERVICE-RENDERING SYSTEM, SERVICE-RENDERING APPARATUS AND METHOD, AND NAVIGATION APPARATUS AND METHOD

(75) Inventor: Kiyokazu Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/919,525

(22) Filed: Jul. 31, 2001

(30) Foreign Application Priority Data

Aug. 3, 2000 (JP) ........................................ 2000-240372

(51) Int. Cl.[7] ............................................. G01C 21/00

(52) U.S. Cl. ........................... 701/200; 701/24; 701/201

(58) Field of Search ................................. 701/200, 201, 701/208, 213, 24; 340/5.6; 73/178 R

(56) References Cited

U.S. PATENT DOCUMENTS

| | | | | |
|---|---|---|---|---|
| 5,951,620 A | * | 9/1999 | Ahrens et al. | 701/200 |
| 6,148,260 A | * | 11/2000 | Musk et al. | 701/200 |
| 6,314,365 B1 | * | 11/2001 | Smith | 701/208 |
| 6,347,278 B2 | * | 2/2002 | Ito | 701/201 |
| 6,349,527 B1 | * | 2/2002 | Liu et al. | 701/24 |

* cited by examiner

*Primary Examiner*—Richard M. Camby
(74) *Attorney, Agent, or Firm*—Jay H. Maioli

(57) ABSTRACT

A service-rendering system wherein control information is generated for controlling operations of a navigation apparatus provided on a movable body by cooperation of a terminal operated by a user and a service-rendering apparatus for rendering services, the control information is transmitted to the navigation apparatus located at a location separate from the terminal and from the service-rendering apparatus, and information on navigation is generated prior to use of the movable body by the user.

33 Claims, 15 Drawing Sheets

| | USER INFORMATION (USER ID) | PORTABLE-TELEPHONE ID (PHONE NUMBER OR MAIL ADDRESS) | NAVIGATION ID (PHONE NUMBER OR MAIL ADDRESS) | PASSWORD |
|---|---|---|---|---|
| 1 | | | | |
| 2 | | | | |
| 3 | | | | |

FIRST PAGE

SECOND PAGE

LINK PAGE

THIRD PAGE

FOURTH PAGE

FIFTH PAGE

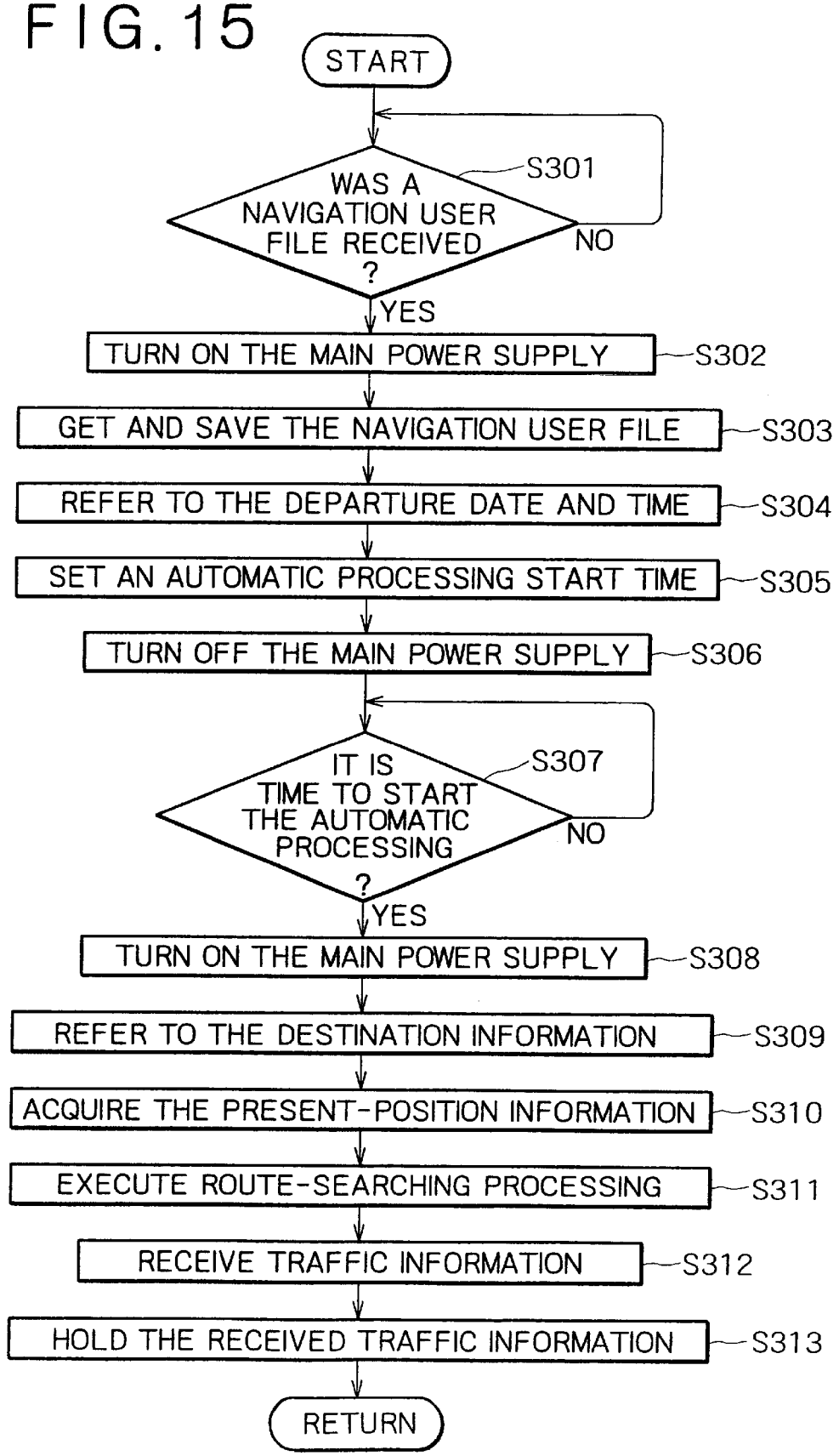

SERVICE-RENDERING SYSTEM, SERVICE-RENDERING APPARATUS AND METHOD, AND NAVIGATION APPARATUS AND METHOD

BACKGROUND OF THE INVENTION

The present invention relates to a service-rendering system, service-rendering apparatus and service-rendering method, and navigation apparatus and navigation method used for generating navigation information for the navigation apparatus provided on a movable body.

The so-called car navigation apparatus is becoming popular. Some basic functions of the car navigation apparatus is to measure the present position of a running car employing the navigation apparatus and to display the measured present position on a map to inform the user of the position. In addition, in recent years, there has been commonly known a navigation apparatus capable of searching a map for a route to a given travel destination and navigating the driver on the basis of the route found in the search. In utilization of a car navigation apparatus having such a function, typically, before departing for a travel destination, the user operates the car navigation apparatus to let the apparatus search a map for a route, acquire information on traffic and display the acquired information on traffic on a map. Typically, the user uses reference information in the search. That is to say, when driving a car or the like to a travel destination, the user carries out preparatory commands to a certain degree prior to the departure in order to effectively use functions of the car navigation apparatus. However, the user needs to carry out such preparatory operations inside the car usually at a parking lot. Thus, the user normally carries out preparatory operations such a search of a map for a travel destination prior to a departure when the user gets into the car. Since the user is doing things in a hurry at such a time prior to a departure, however, the user will suffer from much stress and feel cumbersome.

SUMMARY OF THE INVENTION

It is an object of the present invention to provide a service-rendering system, service-rendering apparatus, service-rendering method, navigation apparatus and navigation method used for generating navigation information for the navigation apparatus in collaboration with a terminal operated by the user and the service-rendering apparatus for rendering services prior to use of the movable body by the user.

According to a first aspect of the present invention, there is provided a service-rendering system for transmitting data, which is used for controlling operations of a first apparatus provided on a movable body existing at a separated location, to the first apparatus, the service-rendering system including: a service-rendering apparatus used for generating control data for controlling operations of the first apparatus and used for transmitting the generated control data to the first apparatus by way of a radio transmission apparatus connected to a network and used for transmitting data to the first apparatus by radio transmission; a terminal connected to the service-rendering apparatus through the network and used for transmitting data to be used by the service-rendering apparatus for generating the control data to the service-rendering apparatus; a communication apparatus connected to the service-rendering apparatus through the network and used for transmitting the control data received from the service-rendering apparatus to the first apparatus by radio transmission; and a control apparatus provided on the movable body, connected to the communication apparatus by radio communication, used for receiving the control data from the radio transmission apparatus and used for controlling the first apparatus.

According to a second aspect of the present invention, there is provided a navigation apparatus, mounted on a movable body, for setting a navigation operation based on control data received from a service-rendering apparatus, the navigation apparatus including: radio communication means for communicating data by radio communication; storage means for storing the control data received by the radio communication means; power-supply control means for controlling a power supply of said navigation apparatus; time-measuring means for measuring the length of a time; navigation-information-generating means for generating navigation information; and control means for controlling the storage means to store the control data received by the radio communication means; controlling the power-supply control means to turn on and off the power supply of the navigation apparatus on the basis of the control data and the time data measured by the time-measuring means; and controlling the navigation-data-generating means to generate the navigation information based on the control data.

According to a third aspect of the present invention, there is provided a service-rendering apparatus equipped with a radio communication function, used for generating control data for controlling a navigation apparatus installed on a movable body and used for transmitting the control data to the navigation apparatus, the service-rendering apparatus including: communication means used for communicating with a radio communication apparatus for transmitting the control data to the navigation apparatus by radio transmission and used for communicating with a terminal operated by the user through a network; authentication-data storage means for storing authentication data for authenticating an ID code received from the terminal by associating the authentication data with one of navigation-apparatus IDs for identifying the navigation apparatus; content-generation-data storage means for storing content generation data used for generating a content transmitted to the terminal and used for requesting the user to enter a command to generate the control data; control-data storage means for storing control data for each of the navigation-apparatus IDs; and control means for executing the steps of authenticating an ID code received by the communication means from the terminal by comparison of the ID code with the authentication data stored in the authentication-data storage means and forming a judgment as to whether or not to establish a communication with the terminal; generating a content based on the content generation data stored in the content-generation-data storage means for the terminal with the ID code thereof authenticated; controlling the communication means to transmit the generated content to the terminal with the ID code thereof authenticated; generating control data based on a command received by the communication means from the terminal with the ID code thereof authenticated and storing the generated control data in the control-data storage means by associating the control data with one of the navigation-apparatus IDs which is associated with the terminal's ID code stored in the authentication-data storage means; and controlling the communication means to drive the radio communication apparatus to transmit the control data to a navigation apparatus identified by the navigation-apparatus ID associated with the control data in the control-data storage means.

According to a fourth aspect of the present invention, there is provided a navigation apparatus provided on a movable body communicating with a service-rendering apparatus generating control data used for navigating the movable body at a request made by the user by operating a terminal, the navigation apparatus including: radio communication means for receiving control data generated by the service-rendering apparatus and transmitted by way of a radio communication apparatus; storage means for storing the control means received by the radio communication means; playback means for playing back geographical data used for navigation from a recording medium for storing the geographical data; measurement means for measuring a present position of the movable body; display means for displaying a map based on geographical data played back by the playback means; a navigation-information-generating means for generating navigation information based on travel-destination data included in the control data, present-position data measured by the measurement means, and geographical data played back by the playback means; and a control means for controlling the storage means to store control data received by the radio communication means; controlling the measurement means to measure the present position of the movable body; controlling the playback means to play back geographical data based on travel-destination data included in the control data and present-position data measured by the measurement means; controlling the navigation-information-generating means to generate navigation information; and controlling the display means to display a map generated on the basis of the reproduced geographical data and the generated navigation information.

According to a fifth aspect of the present invention, there is provide a method for controlling a navigation apparatus provided on a movable body communicating with a service-rendering apparatus for generating control data used for navigating the movable body at a request made by the user by operating a terminal, the method comprising the steps of receiving the control data from the service-rendering apparatus; storing the received control data in a storage means provided in the navigation apparatus; measuring a present position of the movable body; generating navigation information based on travel-destination data included in the control data and based on data. on the present position; and displaying the generated navigation on a display unit.

According to a sixth aspect of the present invention, there is provided a service-rendering method for generating control data for controlling a navigation apparatus installed on a movable body and provided with a radio communication function and for transmitting the control data to the navigation apparatus, the service-rendering method including the steps of receiving an ID code transmitted by a terminal operated by the user; authenticating the received ID code; transmitting a content to the terminal if the terminal is authenticated successfully as a terminal having a right to receive a service allowed by authentication; receiving a command from the authenticated terminal; generating control data based on the received command; and transmitting the generated control data to the navigation apparatus associated with the ID code.

According to a seventh aspect of the present invention, there is provided a service-rendering system including: a navigation apparatus provided with at least a radio communication terminal function, installed on a movable body and identified by a peculiar one of apparatus IDs which is assigned to the navigation apparatus as an apparatus ID inherent to the navigation apparatus; a service server provided with a service-rendering function and used for storing the apparatus IDs each assigned to one of a plurality of navigation apparatuses each capable of rendering a service; a user terminal; one or more communication networks enabling communications between the navigation apparatus and the service server and communications between the user terminal and the service server; access means for allowing the user terminal to make an access to the service server through the communication network; control-data-generating means for generating control data for at least controlling operations of the navigation apparatus associated with the user terminal in accordance with an operation carried out on the user terminal already making an access to the service server and for requesting the service server to store the control data; transmission means for transmitting the control data to a specific one of the navigation apparatuses which is accessed by the service server by using the apparatus ID assigned to the specific navigation apparatus; and control means for controlling the navigation apparatus to carry out a predetermined operation based on received control data.

According to an eighth aspect of the present invention, there is provide a navigation apparatus mounted on a movable body, including: communication means for enabling a communication through a predetermined communication network with a service server for storing control data generated in accordance with data instructed through a communication with a user terminal associated with the navigation apparatus; and control means for executing control to carry out a predetermined operation based on the control data received by the communication means to be used for controlling the predetermined operation of the navigation apparatus.

BRIEF DESCRIPTION OF THE DRAWINGS

FIG. 15 is a flowchart representing operations for implementing automatic processing based on a user file in a navigation system implemented by the embodiment.

DETAILED DESCRIPTION OF THE PREFERRED EMBODIMENT

Figure 1:
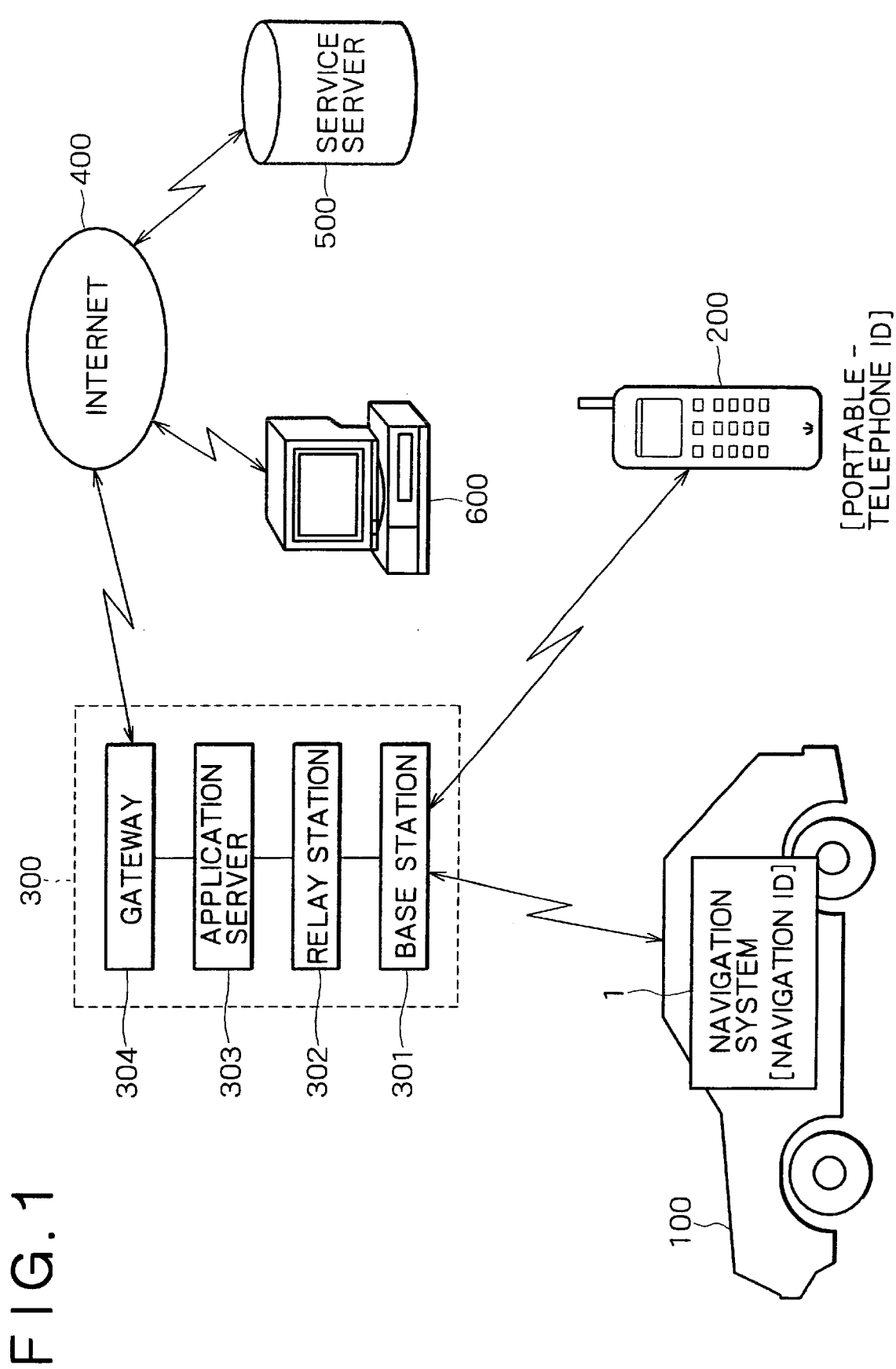
FIG. 1 is an explanatory diagram showing a typical configuration of a service-rendering system implemented by an embodiment of the present invention.

The following description explains a service-rendering system implemented by an embodiment of the present invention and a navigation apparatus used in the service-rendering system. It should be noted that the service-rendering system and the navigation apparatus are explained in the following order:

1: Service-Rendering System
1-1: Overall Configuration
1-2: User Terminal
1-3: Overall Configuration of the Navigation-System
1-4: Internal Configuration of a Navigation Main Unit
1-5: Internal Configuration of a Portable Telephone
1-6: Internal Configuration of an Application Server
1-7: Internal Configuration of a Service Server 2: Typical Implementation of Service Rendering by the Service-Rendering System 3: Typical Processing 1: Service-Rendering System
1-1: Overall Configuration FIG. 1 is an explanatory diagram showing a typical configuration of a service-rendering system implemented by an embodiment of the present invention. As shown in the figure, a navigation system 1 is provided on a car 100. The navigation system 1 has a configuration including the so-called navigation apparatus serving as a base, a security system for preventing the car 100 from being stolen and a communication terminal capable of communicating data through a radio-telephone-communication network 300. The recipient of a service rendered by the service-rendering system implemented by the embodiment is the owner of the car 100 and the user purchasing the navigation system 1.

A portable telephone 200 is typically under the same name as the user of the navigation system 1 and put under a contract made with a communication company managing the radio-telephone-communication network 300. As described above, the portable telephone 200 is capable of carrying out a telephone conversation using a telephone line through the radio-telephone-communication network 300. In this case, the portable telephone 200 is also capable of communicating data through a connection with the Internet 400.

As shown in the figure, the radio-telephone-communication network 300 comprises a base station 301, a relay station 302, an application server 303 and a gateway 304. These base station 301, the relay station 302, the application server 303 and the gateway 304 are facilities for implementing mobile communication with a radio terminal in addition to the portable telephone 200. In the case of this embodiment, an example of the radio terminal is a radio terminal provided for the car navigation apparatus 100. To be more specific, the base station 301 and the relay station 302 allow a radio communication to be established with typically a radio terminal. The application server 303 plays a role of connecting a radio terminal to the Internet 400. The application server 303 typically carries out processing required for Internet functions provided by a radio communication company. Data processed by the application server 303 is converted by the gateway 304 into data that allows the radio terminal connected to the radio-telephone-communication network 300 to be eventually connected to the Internet 400.

A variety of servers is connected to the Internet 400. In this embodiment, a service server 500 is connected to the Internet 400 as shown in the figure. The service server 500 is capable of rendering a variety of services to users. It should be noted that typical services rendered by the service server 500 will be described later. In addition, while only one service server 500 is shown in the figure, in actuality, it is possible to provide the service-rendering system with a configuration including a plurality of servers for enterprises rendering services and divisions within an enterprise, which render services. Examples of rendered services are after services for a purchased car navigation system 1 and utilization services for a security system employed in the navigation system 1. Typically, a service server for rendering the after services is provided by the manufacturer of the navigation system 1 and another service server for rendering the utilization services is provided by an enterprise operating the security system.

A user terminal 600 is a terminal owned by the user of the navigation system 1. Typically, the user terminal 600 is a personal computer having a function to communicate with the Internet 400.

In the configuration described above, the user terminal 600, the navigation system 1, the portable telephone 200 and other apparatuses are connected to the Internet 400 which allow the user terminal 600, the navigation system 1, the portable telephone 200 and the other apparatuses to make accesses to a variety of web sites. In addition, the user terminal 600, the navigation system 1, the portable telephone 200 and the other apparatuses are capable of exchanging e-mails with each other. It is also needless to say that the portable telephone 200 is also capable of having a phone conversation through an ordinary telephone line.

1-2: User Terminal

Figure 2:
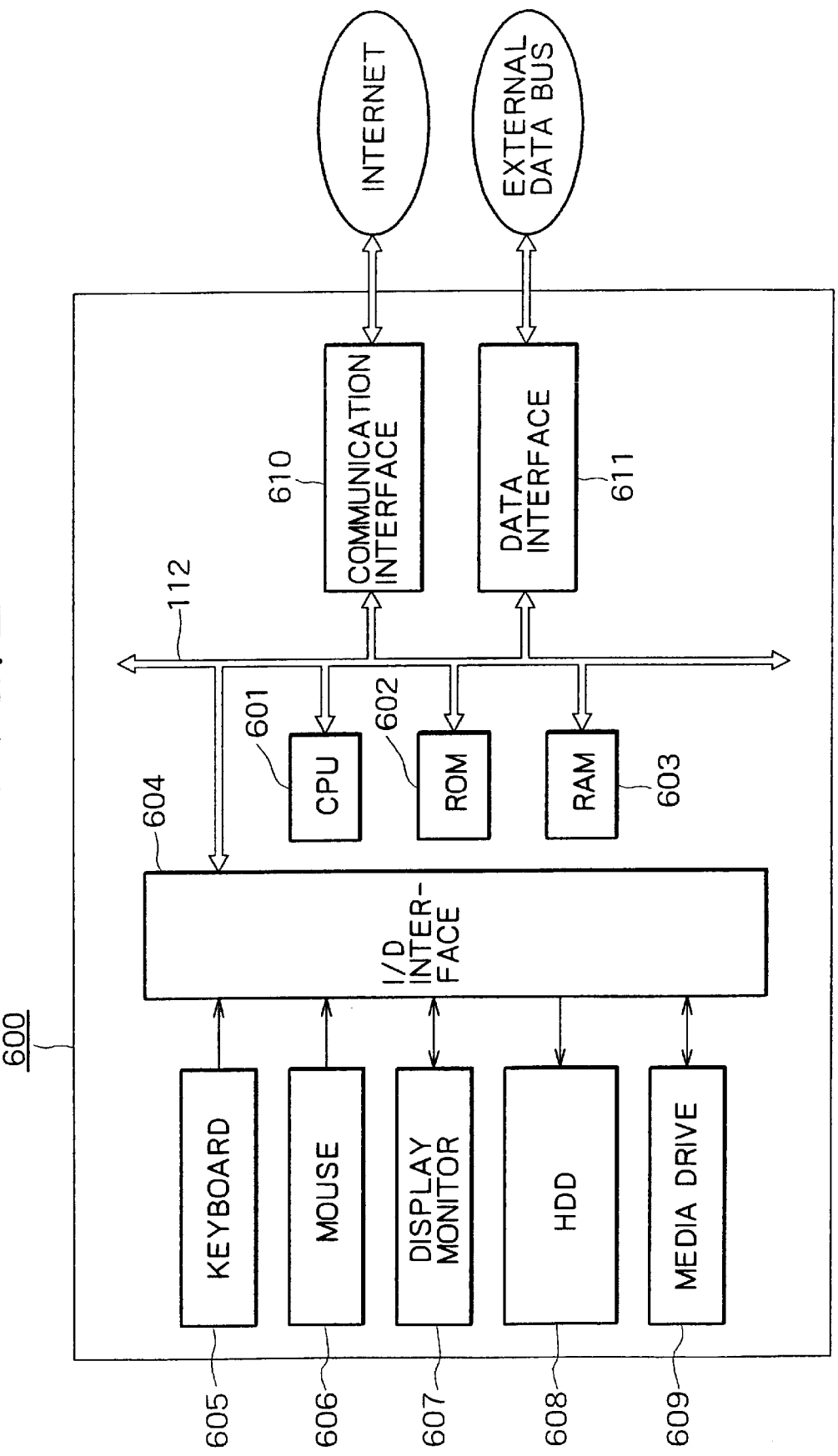
FIG. 2 is a block diagram showing a typical internal configuration of a user terminal implemented by the embodiment.

FIG. 2 is a block diagram showing a typical internal configuration of the user terminal 600 implemented by the embodiment. As described earlier, the user terminal 600 is a personal computer connectable to the Internet 400.

In the figure, a CPU (Central Processing Unit) 601 carries out various kinds of processing by executing a variety of programs stored typically in a ROM (Read-only Memory) 602. A RAM (Random-Access Memory) 603 is properly used for storing data required in the execution of the various kinds of processing.

An I/O interface unit 604 is connected to a keyboard 605 and a mouse 606, which generate operation signals supplied to the CPU 601. The I/O interface unit 604 is also connected to an HDD (Hard-Disc Drive) 608 on which a hard disc is mounted to serve as a recording medium. The CPU 601 is capable of storing and reading out data and a program into and from the hard disc of the HDD 608 through the I/O interface unit 604. The I/O interface unit 604 is further connected to a display monitor 607 for displaying a picture.

A media driver 609 serves as a driver of media with a specific type. The media driver 609 reads out and writes data from and into the media.

A communication interface unit 610 is an interface unit for implementing communications through the Internet 400. If a telephone line is used for a connection to the Internet 400, for example, a modem is used as hardware of the communication interface unit 610. If a network is used for a connection to the Internet 400, on the other hand, the communication interface unit 610 functions as an interface such as the Ethernet.

A data interface unit 611 is an interface unit for communications with external peripheral equipment. The communications conform to specifications such as an SCSI (Small Computer System Interface), a USB (Universal Serial Bus) and an IEEE1394 (Institute of Electrical and Electronic Engineers).

An internal data bus 612 has a PCI (Peripheral Component Interface) configuration or the same configuration as a local bus. The internal data bus 612 connects the internal functional circuits to each other.

1-3: Overall Configuration of the Navigation System

Figure 3:
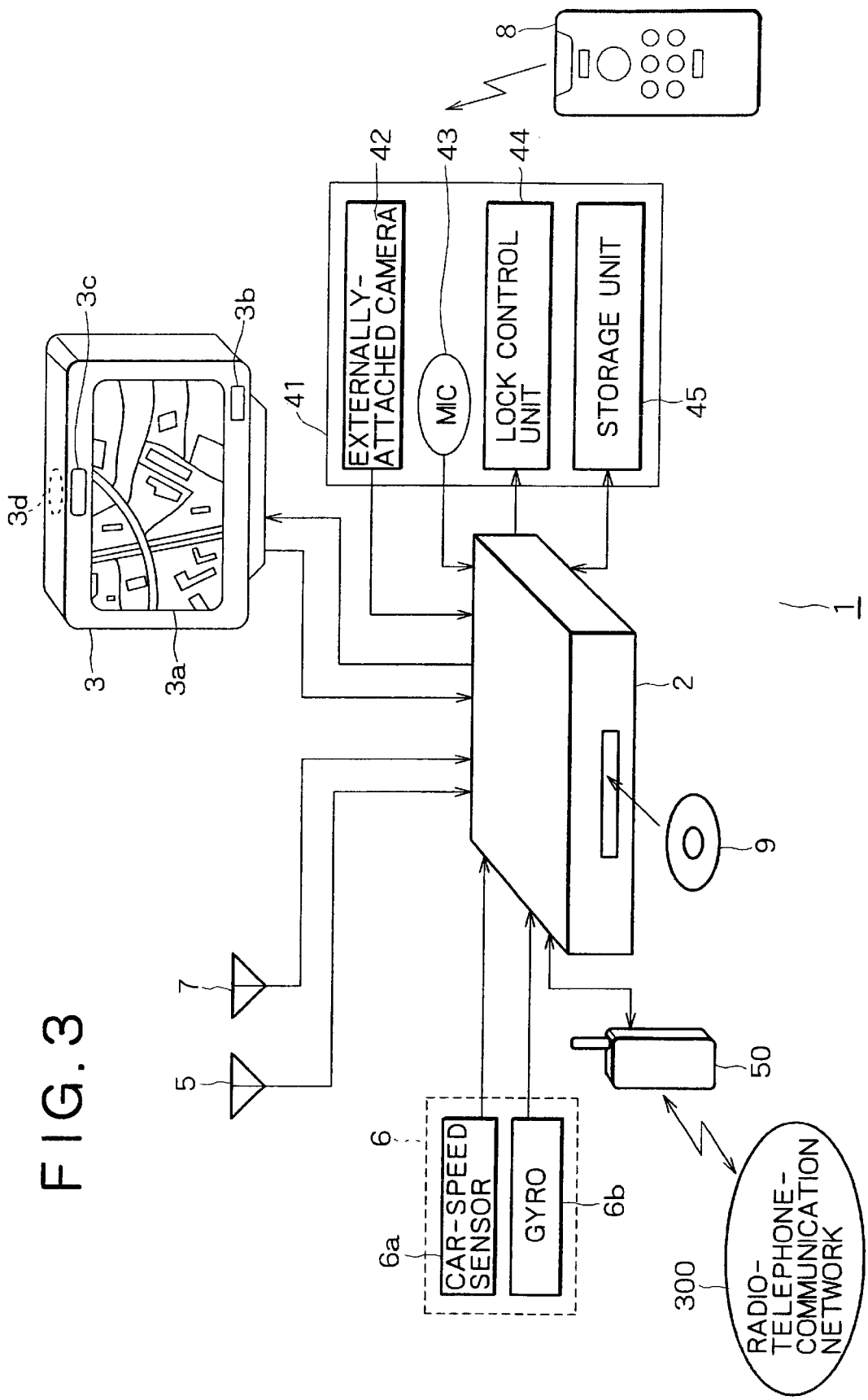
FIG. 3 is an explanatory diagram showing a navigation system implemented by the embodiment.

FIG. 3 is an explanatory diagram showing a navigation system 1 implemented by the embodiment. As shown in FIG. 3, the navigation system 1 implemented by the embodiment comprises typically a navigation main unit 2, a display monitor unit 3, a GPS (Global Positioning System) antenna 5, a traffic-information receiving antenna 7, a self-contained navigation unit 6, a communication terminal 50, a security system unit 41 and a remote controller 8.

Details of the navigation main unit 2 will be described later. The present position of a car 100 can be displayed on a map generated internally by reading out map information and present position information from the recording medium 9 on a display screen 3a of the display monitor unit 3. Navigation information comprising drive routes and a variety of guides can also be displayed.

Examples of the recording medium 9 are a CD-ROM (Compact-Disc Read-Only Memory) and a DVD-ROM (Digital Video Disc/Digital Versatile Disc-Read Only Memory). The recording medium 9 is used for storing map information.

The display screen 3a of the display monitor unit 3 is typically a liquid-crystal display used for displaying a picture output by the navigation main unit 2. A receiving unit 3b receives a command from the remote controller 8. The command is supplied to the navigation main unit 2 as will be described later.

An audio output unit such as a speaker not shown in the figure can also be provided on the navigation apparatus (the navigation system 1) implemented by the embodiment. With such an audio output unit, the navigation main unit 2 outputs audio navigation information such as a predetermined point like a crossing, a state of traffic congestion, left-turn and right-turn points and a wrong way. In this case, the audio output unit in turn informs the user of a warning or a guidance voice based on the audio navigation information.

The GPS antenna 5 receives an electric wave from typically a GPS satellite. The electric wave received by the GPS antenna 5 is demodulated as received data and a result of the demodulation is supplied to the navigation main unit 2. As will be described later, the result of the modulation is used for determining the present position of the car 100.

The traffic-information-receiving antenna 7 serves for a predetermined road traffic communication system. The traffic-information-receiving antenna 7 is capable of receiving information on road traffic which is transmitted by using an FM multiplexing, beam-beacon or wave-beacon technique. Examples of the information on road traffic are a state of traffic congestion on a road and information on a parking lot. The navigation main unit 2 is capable of displaying a state of traffic congestion on a road based on the information on road traffic, displaying a required travel time based on the state of traffic congestion and displaying locations of parking lots.

The self-contained navigation unit 6 is a member for detecting information on the car running state such as the speed of the car 100 and the direction in which the car 100 is heading. As shown in the figure, the self-contained navigation unit 6 comprises a car-speed sensor 6a and a gyro 6b. The car-speed sensor 6a is used for detecting car-speed pulses with a frequency representing the speed of the car 100. On the other hand, the gyro 6b is used for detecting the direction toward which the car 100 is heading. The self-contained navigation unit 6 also outputs the information on the running state of the car 100 detected by the self-contained navigation unit 6 to the navigation main unit 2 which uses the information for finding the present position of the car 100. In particular, the self-contained navigation unit 6 is used for determining the present position of the car 100 when an electric wave cannot be received from the a GPS satellite by the GPS antenna 5 of the car 100 in a tunnel or an underground passage.

The user uses the remote controller 8 for operating the navigation system 1 implemented by the embodiment. The controller comprises a variety of operation keys, a signal-generating unit and an output unit. The signal-generating unit generates a command signal representing an operation carried out on one of the operation keys.

The output unit outputs the command signal as a modulated-intensity infrared-ray signal to the receiving unit 3b.

It should be noted that, in place of the remote controller 8, it is possible to provide another operation means such as a remote controller for transmitting electric waves, a remote controller connected to the navigation main unit 2 by a wire or an operation unit provided on the cabinet of the navigation main unit 2 or the cabinet of the display monitor unit 3.

The communication terminal 50 is a terminal for the mobile communication. The communication terminal 50 is used for connecting the navigation main unit 2 to the Internet 400 through the radio-telephone-communication network 300 shown in FIG. 1. By connecting the communication terminal 50 to the navigation main unit 2, the navigation main unit 2 is enabled to transmit data by radio communication. On the other hand, data received by the communication terminal 50 can be supplied to the navigation main unit 2 which then carries out necessary processing on the data. That is to say, by connecting the communication terminal 50 to the navigation main unit 2, the navigation system 1 implemented by the embodiment is capable of executing at least Internet-connected functions.

The security-system unit 41 has functions to assure security of the car 100 itself and passengers. The security-system unit 41 comprises an externally-attached camera 42, a microphone 43, a lock control unit 44 and a storage unit 45. Typically, the externally-attached camera 42 actually comprises a plurality of camera units which are installed at predetermined positions inside and outside the car 100, being each oriented in a direction matching the purpose of the installation. The camera units are capable of taking pictures of the inside of the car 100 and circumstances surrounding the car 100.

For the same purposes, for the display monitor unit 3, a car-internal camera 3c and a front camera 3d are provided. The car-internal camera 3c is provided on the surface of the display screen 3a and the front camera 3d is installed in such a way that a picture can be taken from the rear portion of the display monitor unit 3. The display monitor unit 3 is installed at such a location in close proximity to the front glass inside the car 100 that the front visual field of the driver is not obstructed. By installing the display monitor unit 3 at such a location, the car-internal camera 3c is capable of taking a picture of the inside of the car 100 and the front camera 3d is capable of taking a picture of what exists in front of the car 100. Since the car-internal camera 3c, the front camera 3d and the externally-attached camera 42 can be regarded as a combination, the externally-attached camera 42 can be built to comprise a plurality of camera units installed on the car 100 at locations that allow typically pictures of things behind the car 100, on the right side and on the left side of the car 100 to be taken. It should be noted that these camera units each supply an image-taking picture signal to the navigation main unit 2 to be stored in a storage unit 45 as moving-picture data as will be described later. As an image-taking device, typically, a CCD is used.

A microphone 43 for inputting sounds generated by sources external to the car 100 is installed on the car 100. The input sounds are supplied to the navigation main unit 2 as an audio signal and stored in the storage unit 45 as will be described later.

A lock control unit 44 capable of controlling operations to lock and unlock keys of the car 100 is also provided on the car 100. In addition, in accordance with the state of a control mechanism member for locking and unlocking keys of the car 100, the lock control unit 44 is capable of providing the navigation main unit 2 with information on a lock state indicating whether a key is locked or not.

The storage unit 45 includes a storage device typically capable of storing data with a relatively large size. Media used as the storage unit 45 is not specially prescribed. For example, a hard disc can be used. As an alternative, other disc media or a non-volatile memory device or the like can also be used. In the case of this embodiment, the storage unit 45 is used for storing data of moving pictures taken by the camera units and data of the audio signal input by the microphone 43. These pieces of data are used as base information for reproducing the inside of the car 100 and circumstances surrounding the car 100.

1-4: Internal Configuration of the Navigation Main Unit

Figure 4:
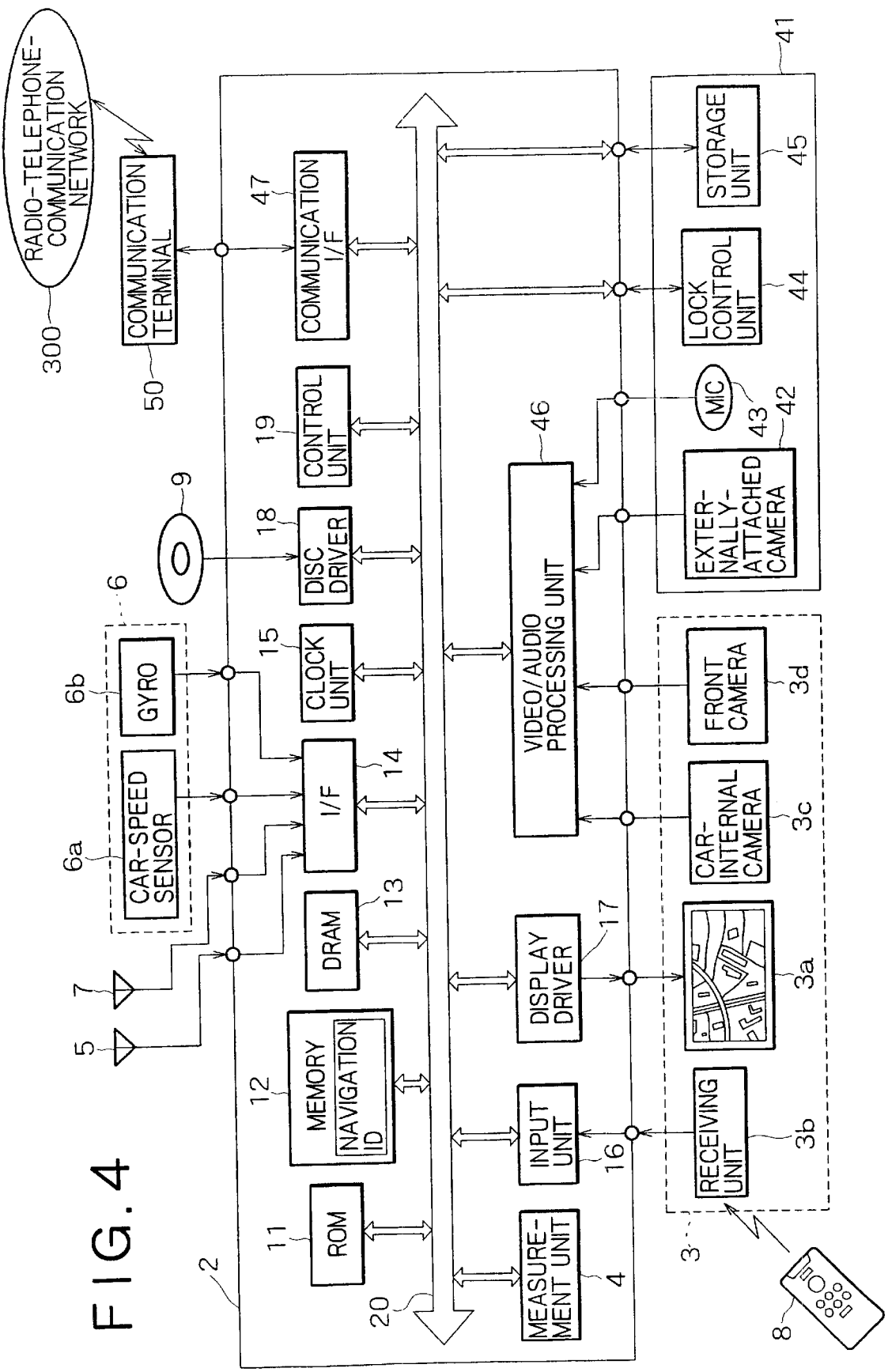
FIG. 4 is a block diagram showing a typical internal configuration of the navigation system implemented by the embodiment.

FIG. 4 is a block diagram showing a typical internal configuration of the navigation main unit 2. A measurement unit 4 employed in the navigation main unit 2 shown in FIG. 4 is a member for measuring the present position of the car 100. The measurement unit 4 typically carries out predetermined processing based on GPS data received from the interface unit 14 and information on the running state of the car 100 to find a longitude and a latitude which represent positional information indicating the present position of the car 100.

A ROM (Read-Only Memory) 11 is used for storing a variety of programs to be executed by the navigation system 1 implemented by the embodiment in order to carry out necessary processing. The ROM 11 is also used for storing factory-set data which cannot be changed as a rule. A memory 12 is an EEPROM (Electrically Erasable Read Only Memory) capable of retaining data stored therein even if the power supply is turned off. A representative example of the EEPROM is a flash memory. The memory 12 is used for storing the so-called backup data. The backup data is various kinds of information such as mainly a travel destination set by the user and a route leading to the travel destination. If a rewritable memory device such as a non-volatile memory or a flash memory is used in place of the ROM 11, the programs and the factory-set data, which are stored therein, can be changed if necessary in the so-called update operation. In this embodiment, the programs and the factory-set data stored in the ROM 11 can be updated.

In addition, in this embodiment, a navigation ID assigned uniquely to the navigation system 1 is stored in the memory 12. The navigation ID is assigned typically when the user is cataloged after determination to purchase the navigation system 1. That is to say, the navigation ID is written at a stage prior to a delivery of the navigation system 1 to the user. After the navigation system 1 is purchased by the user, the navigation system 1 is connected to the Internet 400. Then, when the user is cataloged in the so-called online cataloging process, the navigation ID assigned to the navigation system 1 is received from the service server 500 to be stored in the memory 12.

A DRAM (Dynamic Random Access Memory) 13 is used by a control unit 19 as a work area in execution of a various kinds of processing. The DRAM 13 is also used in execution of processing to generate navigation picture information based on, among others, map information played back by a disc drive 18 from the recording medium 9.

An interface (I/F) unit 14 is provided for connecting the navigation main unit 2 to an external apparatus. The interface unit 14 inputs data received by the GPS antenna 5. The interface unit 14 also inputs road-traffic information received by the traffic-information-receiving antenna 7. The interface unit 14 also receives car-speed pulses detected by the car-speed sensor 6a of the self-contained navigation unit 6. The interface unit 14 also receives the car 100's running-direction information detected by the gyro 6b. The data received from the GPS antenna 5, speed pulses of the car 100 received from the self-contained navigation unit 6 and the information on a running direction (or information on the car running) are transferred to the measurement unit 4 through an internal data bus 20. In the measurement unit 4, the pieces of information transferred through the internal data bus 20 are received as parameters used for determining the present position of the car 100. The road-traffic information received by the traffic-information-receiving antenna 7 is typically written into the DRAM 13 to be stored therein under control executed by the control unit 19. In addition, the control unit 19 executes image-processing control and the like to read out the road-traffic information from the DRAM 13 in order to reflect the road-traffic information in a map to be displayed on the display monitor unit 3.

A clock unit 15 measures the present time. Information on the present time is used in time management required in the navigation system 1.

An input unit 16 is connected to a receiving unit 3b employed in the display monitor unit 3. The receiving unit 3b receives a command signal from the remote controller 8. The command signal received from the remote controller 8 is converted into data with a format allowing the data to be transferred through the internal data bus 20. The data with such a format is then supplied to the control unit 19 through the internal data bus 20. The control unit 19 properly executes necessary control according to the command signal received from the receiving unit 3b.

Controlled by the control unit 19, the display driver 17 generates picture information to be displayed and outputs the information to the display screen 3a of the display monitor unit 3 by way of a terminal 34. For example, the display driver 17 generates a picture signal representing the present position of the car 100 from the map information read out from the recording medium 9 and the car-present-position information computed by the measurement unit 4, and outputs the picture signal to the display monitor unit 3.

A disc driver 18 is a member for playing back data from the recording medium 9. The disc driver 18 actually has a function for playing back data recorded on the recording medium 9 in a media format adopted for the recording medium 9. For example, map information or other data played back from the recording medium 9 is transferred to the DRAM 13 through the internal data bus 20 to be stored therein, and the control unit 19 reads out the information or the data back from the DRAM 13 with a proper timing to use the information or the data as data to be displayed.

An audio and video processing unit 46 carries out necessary digital-signal processing on a taken-picture signal and an audio signal which are supplied thereto. Eventually, the audio & video processing unit 46 converts the signals into data to be recorded with a format conforming to the storage unit 45. The taken-picture signal supplied to the audio & video processing unit 46 comprises a plurality of signals generated by the car-internal camera 3c, the front camera 3d and the externally-attached camera 42. Typically, first of all, the audio & video processing unit 46 converts the signals supplied thereto at the same time into digital data. Then, the audio & video processing unit 46 carries but processing on a time-division basis on the pieces of taken-picture data, converting each of them into compressed moving-picture data with a predetermined format. On the other hand, the audio signal supplied to the audio & video processing unit 46 is a signal generated by the microphone 43. The audio signal is also converted into digital data which is then converted into compressed audio-signal data with a predetermined format. The compressed moving-picture data and the compressed audio-signal data which are generated by the audio & video processing unit 46 are written into the storage unit 45 through the internal data bus 20 under write control executed by the control unit 19.

When the storage unit 45 becomes full in the course of recording compressed moving-picture data and compressed audio-signal data into the storage unit 45, compressed moving-picture data and compressed audio-signal data stored least recently are deleted so as to allow most recent compressed moving-picture data and compressed audio-signal data to be recorded. By doing so, even a storage unit 45 with a relatively small recording capacity is capable of accommodating required compressed moving-picture data and compressed audio-signal data. When the recording capacity corresponds to a playback time of about several tens of minutes, compressed moving-picture data and compressed audio-signal data can be used to achieve a purpose of leaving a sufficient recorded proof.

It should be noted that the audio & video processing unit 46 can be provided with a configuration including, for example, a decode function for playing back and outputting video and audio data recorded in the storage unit 45. By providing such a decode function, video and audio data recorded in the storage unit 45 can be played back and output to the display monitor unit 3.

A communication interface unit 47 facilitates exchanges of data between the communication terminal 50 and the navigation main unit 2. In an operation to output data from the communication terminal 50 to the navigation main unit 2, for example, the communication interface unit 47 converts the data received from the communication terminal 50 into data with a format that can be processed by the navigation main unit 2. Then, the data with such a format is supplied to functional circuits requiring the data through the internal data bus 20. In an operation to output data from the navigation main unit 2 to the communication terminal 50, on the other hand, the measurement unit 47 converts the data received from the navigation main unit 2 into data with a format that can be processed by the communication terminal 50.

In addition, the operation of the communication terminal 50 is controlled by the control unit 19 employed in the navigation main unit 2. That is to say, by radio communication between the communication terminal 50 and the navigation main unit 2, the navigation system 1 implemented by the embodiment can be provided with a function to communicate with the Internet 400.

The control unit 19 typically includes a CPU (Central Processing Unit) for executing necessary control on circuits. By executing such control, a variety of operations can be implemented in the navigation system 1.

1-5: Internal Configuration of a Portable Telephone

Figure 5:
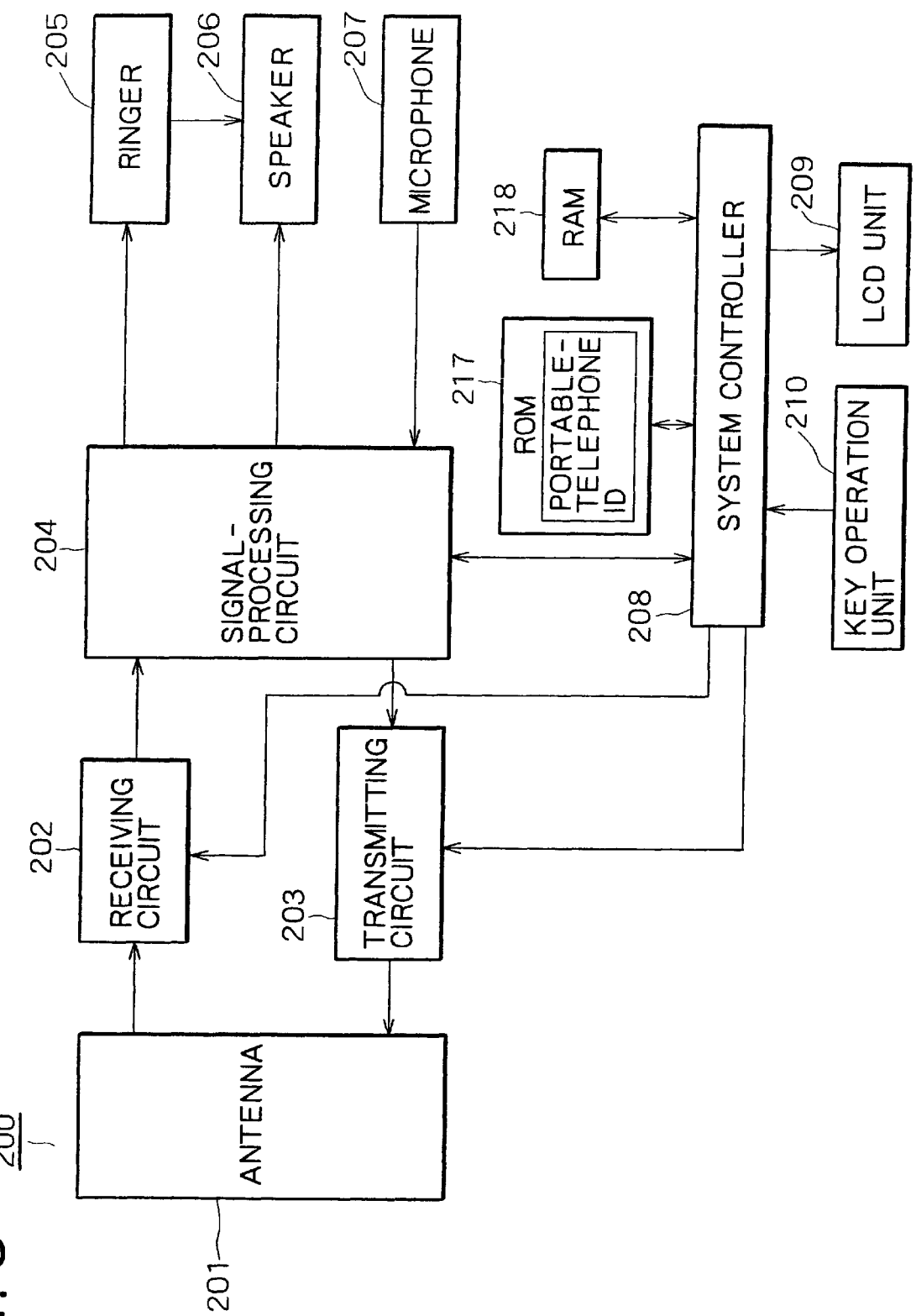
FIG. 5 is a block diagram showing a typical internal configuration of a portable telephone implemented by the embodiment.

FIG. 5 is a block diagram showing a typical internal configuration of a portable telephone implemented by the embodiment in a simple and plain manner.

An electric wave received by an antenna 201 is demodulated by a receiving circuit 202 which then supplies a result of the demodulation to a signal-processing circuit 204. The received electric wave may convey voice data of a telephone-conversation partner. In this case, the signal-processing circuit 204 extracts a voice signal and outputs the signal typically to a speaker 206. If the received electric wave conveys data communicated through a network such as the Internet 400, for example, the data is demodulated. The demodulated data is then displayed on an LCD unit 209 under control executed by a system controller 208. In addition, if an electronic sound accompanying an operation or a calling sound indicating an incoming call needs to be generated, for example, the system controller 208 typically controls a ringer 205 to generate a required ringer sound and to output an audio signal to the speaker 206.

Furthermore, the user's voice input by a microphone 207 during a phone conversation for example is supplied to the signal-processing circuit 204 as an audio signal. The signal-processing circuit 204 carries out predetermined encode processing on the audio signal and outputs a result of the processing to a transmitting circuit 203. The transmitting circuit 203 outputs the processing result received from the signal-processing circuit 204 to the antenna 1 for transmission.

The system controller 208 executes various kinds of control in order to carry out a variety of operations for a telephone conversation. The system controller 208 has a ROM 217 and a RAM 218. The ROM 217 is a rewritable memory such as a flash memory or an EEPROM. The ROM 217 is used for storing programs to be executed by the system controller 208 and data to be displayed. The ROM 217 is also used for recording various kinds of data set or cataloged by the user. Examples of such data are a telephone directory and received mails. In addition, in this embodiment, the ROM 217 is used for storing a portable-phone ID assigned uniquely to the portable telephone 200. In the case of a portable telephone, the portable-phone ID is a telephone number or a mail address, which is assigned to the portable phone.

A key operation unit 210 comprises a predetermined plurality of button keys. The key operation unit 210 outputs an operation-information signal representing an operation carried out on a button key to the system controller 208. The system controller 208 executes control based on the operation-information signal so that necessary processing is carried out.

As shown in the figure, the LCD display unit 209 is driven to display an operating state in accordance with the control executed by the system controller 208.

It should be noted that the internal configuration of the communication terminal 50 provided in the navigation system 1 is basically the same as the configuration shown in FIG. 5. Since the communication terminal 50 is not to be carried by the user and used for a conversation, however, it is possible to eliminate functional circuits such as the ringer 205, the speaker 206, the microphone 207, the LCD display unit 209 and the key operation unit 210. Instead, it is necessary to provide an interface function capable of exchanging data with the measurement unit 47 employed in the navigation main unit 2.

1-6: Internal Configuration of an Application Server

Figures 6A, 6B:
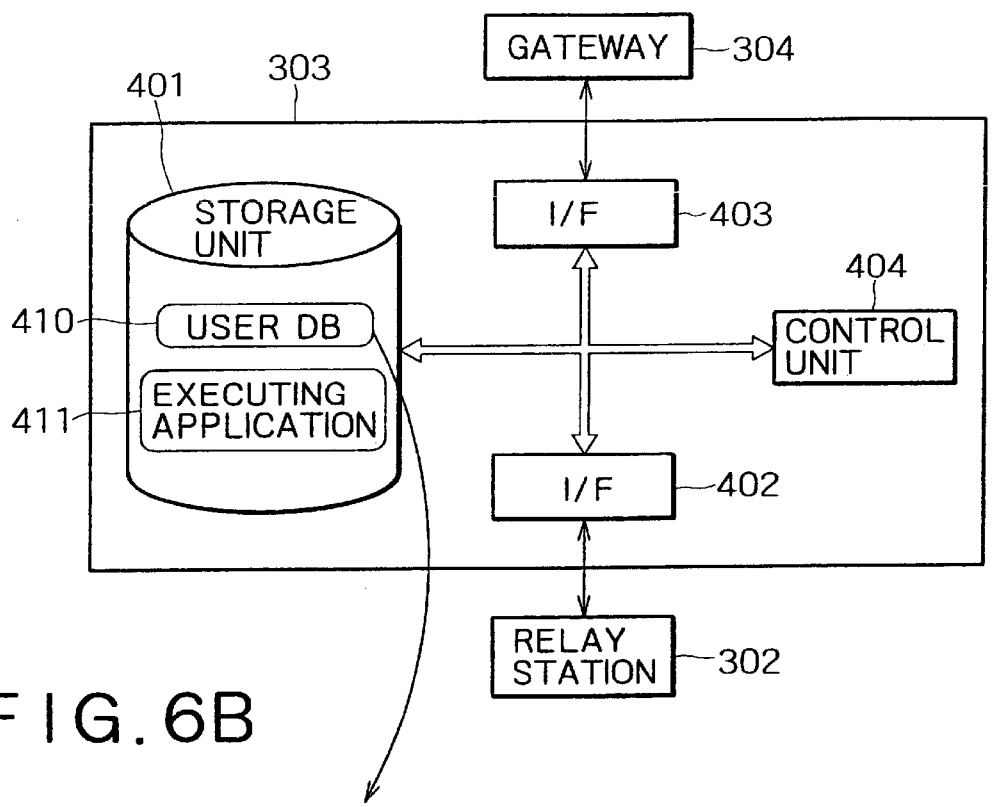
FIG. 6A is a block diagram showing a typical internal configuration of an application server provided in a radio telephone network in the embodiment.
FIG. 6B is a diagram showing a user database in the storage unit shown in FIG. 6A.

FIGS. 6A and 6B are diagrams simply showing a typical internal configuration of an application server 303 provided in the radio-telephone-communication network 300. As shown in FIG. 6A, the application server 303 comprises a storage unit 401, interface units 402 and 403 and a control unit 404. The storage unit 401 is used for storing various kinds of information required in implementation of functions of the application server 303. Representative information stored in the 401 includes a user database 410 and an execution application 411.

As shown in FIG. 6B, the user database 410 includes information on the navigation system 1 and the user of the portable telephone 200. The information includes user information, a portable-phone ID, a navigation ID and a password. The user information may include the user name, the user address and the user birth-date. The user information is various kinds of personal information on the user which are required for rendering services. In this case, the user information may include a user ID. When an access is made by operating the user terminal 600, the user ID is authenticated by forming a judgment as to whether or not the user of the user terminal 600 is an authorized user. The judgment is formed by verifying the password. The portable-phone ID is the same as the portable-phone ID stored in the portable telephone 200 owned by the user. By the same token, the navigation ID is the same as the navigation ID assigned to the navigation system 1 owned by the user. It should be noted that, typically, the navigation ID is conceivably a telephone number assigned to the communication terminal 50 or a mail address assigned to the navigation system 1. By using a telephone number or a mail address as a navigation ID in this way, it is easy to make an access to the communication terminal 50 of the navigation system 1, for example, from the application server 303 or from the service server 500.

By the way, data stored in the user database 410 shown in FIG. 6B is personal information on the user. Such information can be created by acquiring necessary information typically at the following opportunity. For example, the navigation system 1 can be used to purchase a commodity in the so-called Internet shopping using the Internet 400. In this case, in following a purchasing procedure of the Internet shopping, typically, the user enters necessary personal information to an input form displayed on a browser screen. In addition, in the case of the navigation system 1 employing the communication terminal 50 as is the case with this embodiment, when the navigation system 1 is purchased, a contract is also made with a communication company enabling the use of the communication terminal 50. In this embodiment, the application server 303 (or the service server 500) communicates with a sales server to obtain these kinds of information and then catalog the information in a created database. That is to say, when the user purchases the navigation system 1 by taking advantage of the Internet shopping, the user does not need to do necessary cataloging work later to create a user database 410. In addition, the navigation system 1 implemented by this embodiment can be purchased along with, for example, an intangible car insurance as a sales implementation in the Internet shopping. In this case, the prices of the car insurance and the navigation system 1 are discounted. In addition, in the case of an installment-payment contract, a service is offered to make the installment charge free or discounted. Furthermore, if the navigation system 1 and a car insurance are purchased as a combined commodity, information on the user in the user database 410 can be obtained at a stage of entering information to an input form for purchasing the car insurance. It should be noted that, with regard to the portable-phone ID and the password, data which is entered and transmitted by the user by operating the portable telephone 200 typically when a security-service contract is made can be received, obtained and stored. It is needles to say that, in a following procedure to purchase the navigation system 1 by taking advantage of the Internet shopping described above, the portable telephone 200 capable of utilizing a security service can be cataloged. At that time, the portable-telephone ID and the password can be reported.

The execution application 411 comprises a variety of application programs to be executed by the application server 303 to carry out various kinds of processing. The execution application 411 includes an application program having a function for exchanging mails through typically the Internet 400. In addition, the execution application 411 includes an application program for carrying out processing to connect the execution application 411 to the Internet 400 in response to a request for an access to a web page. Such a request is typically made by the portable telephone 200 or the navigation system 1. The execution application 411 also includes an application program for searching the user database 410.

The interface unit 402 is provided for facilitating exchanges of information with the relay station 302. On the other hand, the other interface unit 403 is provided for facilitating exchanges of information with the gateway 304 for setting a connection with the Internet 400. The control unit 404 executes various kinds of control according to application programs of the execution application 411.

1-7: Internal Configuration of a Service Server

Figure 7A:
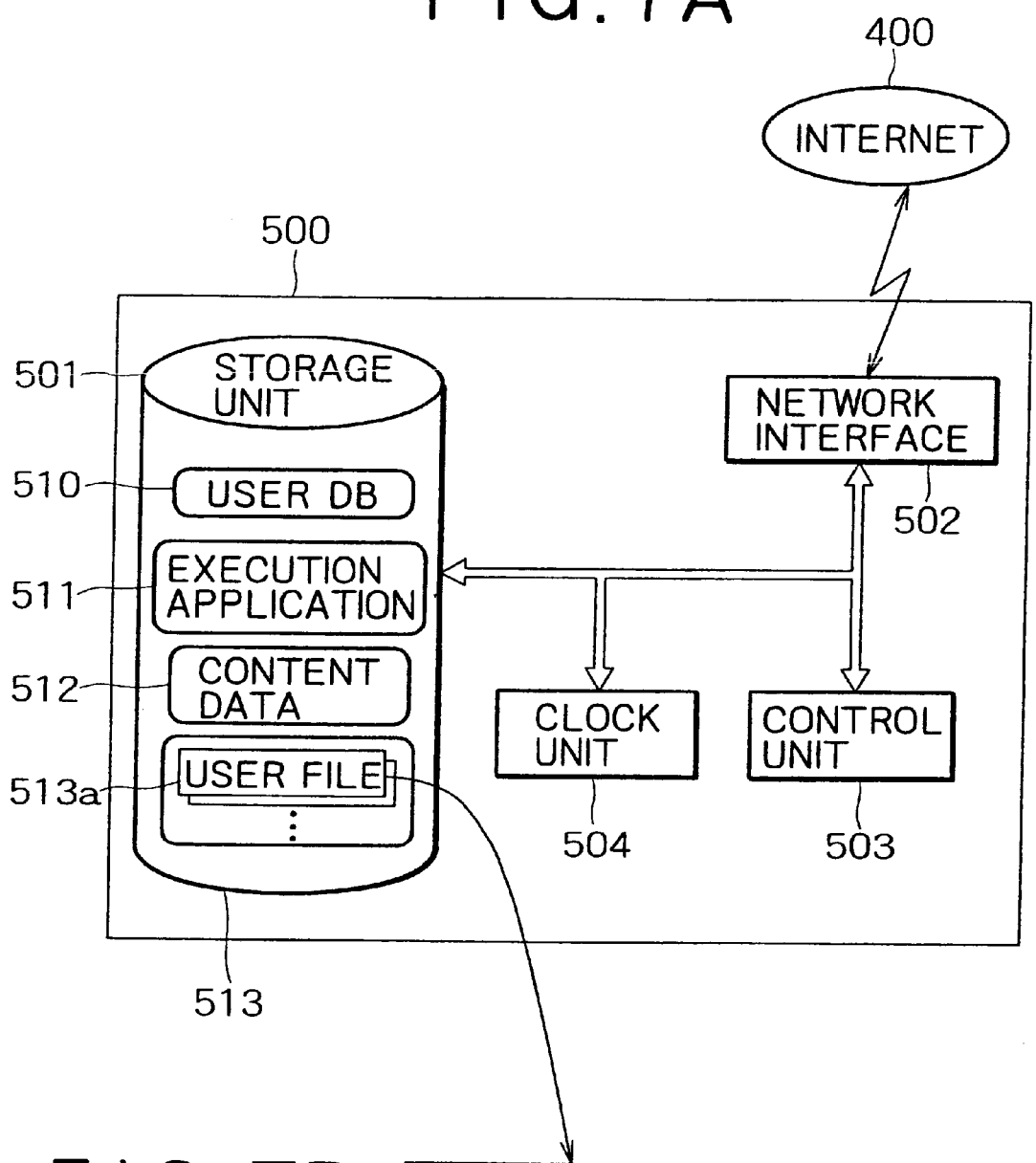
FIG. 7A is a block diagram showing a typical internal configuration of a service server in the embodiment.
Figure 7B:
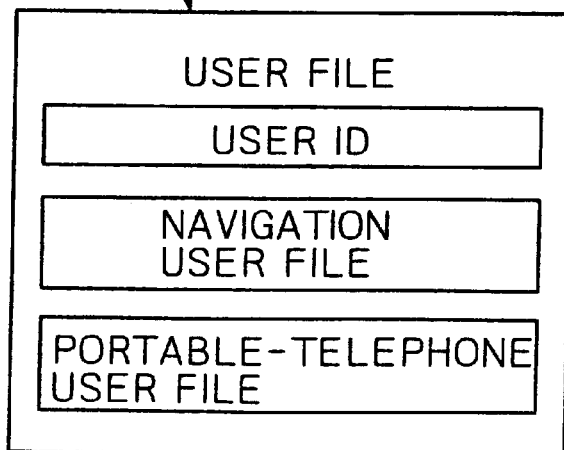
FIG. 7B is a diagram showing a user file in the storage unit shown in FIG. 7A.

FIGS. 7A and 7B are diagrams showing a typical internal configuration of a service server 500. As shown in FIG. 7A, the service server 500 comprises a storage unit 501, a network interface unit 502 and a control unit 503. Also in the case of the service server 500, the storage unit 501 is used for storing various kinds of information required for implementing functions of the service server 500 in rendering a variety of services. Representative information stored in the storage unit 501 includes a user database 510, an execution application 511, content data 512 and a user-file database 513.

The user database 510 can be used for storing the same data as the user database 410 explained earlier by referring to FIG. 6B. By communicating with the application server 303, for example, the same data as the user database 410 can be always stored in the user database 510. To put it in detail, when data stored in either the application server 303 or the service server 500 is updated by typically a new contract made with a user, the server with the user database thereof updated informs the other server that the database has been updated. The other server then updates the user database thereof so as to avoid a discrepancy. The execution application 511 comprises a variety of application programs to be executed by the service server 500 to carry out various kinds of processing.

A content 512 is transmitted when an access is made to a web site uploading a web page to the service server 500 as will be described later. Content data is a web page created typically in an HTML format.

The user-file database 513 is a set of numerous user files 513a. As will be described later, a user file 513a is a created data file based on information which is generated when a variety of operations are carried out on a web page in the service server 500, accompanying an access made by a user terminal 600 to the web page. That is to say, user files 513a are managed in user units. The structure of a user file 513a is shown in FIG. 7B in a simple and plain manner. As shown in the figure, a user file 513a includes a user ID identifying a user associated with the user file 513a. In addition, the user file 513a contains at least a navigation user file and a portable-telephone user file. As will be described later, the navigation user file is transmitted to the navigation system 1 so that the navigation system 1 is capable of using data stored in the navigation user file. By the same token, the portable-telephone user file is transmitted to the portable telephone 200 so that the portable telephone 200 is capable of using data stored in the portable-telephone user file.

The network interface unit 502 is an interface means for connecting the service server 500 to the Internet 400. The control unit 503 executes various kinds of control according to application programs of the execution application 411. A clock unit 504 updates the present time. The control unit 503 is capable of recognizing information on the present time updated by the clock unit 504 at any arbitrary time.

2: Typical Implementation of Service Rendering by the Service-Rendering System

The service-rendering system with a configuration described above renders services as described below in a simple and plain manner. First of all, the user; makes a connection to a web page in the service server 500 through the Internet 400 by operating the user terminal 600 owned by the user. The web page is created in order to comfort a travel planned by the user by using the car 100 on which the navigation system 1 is mounted. In particular, in this embodiment, the user enters data to an input form on the web page in order to remotely control the operation of the navigation system 1 in advance as required in the travel. To put in detail, the service server 500 transmits a navigation user file of a user file shown in FIG. 7B to the navigation system 1 as control information based on data entered by the user to the web page. The navigation system 1 then carries out necessary operations according to the control information. An example of the operations according to data stored in the navigation user file will be described later. In addition, in this embodiment, various kinds of information specified and entered to the web page by operating the user terminal 600 are also transmitted from the service server 500 to the portable telephone 200 at a predetermined time set in advance. For example, it is possible to transmit information on the destination of the travel, guiding information on surroundings of a route leading to the travel destination and information on the weather to mention a few. The same information can also be transmitted to the navigation system 1.

The following concretely describes an implementation to render services by the service-rendering system 1 implemented by the embodiment as described above. In receiving a service rendered by the service-rendering system 1 implemented by this embodiment, first of all, the user needs to operate the user terminal 600 to execute a procedure for receiving a desired service related to a travel planned this time. The operation procedure is described by referring to FIGS. 8, 9, 10, 11 and 13 as follows. FIGS. 8 through 13 each show a browser screen appearing on a display monitor 607 employed in the user terminal 600.

To begin with, the user plans a travel using the car 100 as a movable means. Then, the user carries out a predetermined operation on the user terminal 600 to invoke an application program that allows the user to view a desired site on the Internet 400. To be more specific, the desired site to be accessed is a travel-guiding site in the service server 500. Typically, the travel-guiding site can be utilized by a user who purchased the navigation system 1 and has followed a predetermined procedure for receiving this service. For this reason, when the user makes an attempt to access the travel-guiding site from the user terminal 600 as described above, the service server 500 requests the user to enter a user ID and a password, which are used for authentication of the user. At this request, the user enters a user ID and a password for authentication and transmits them to the service server 500 which then authenticates the user making an attempt to access the travel-guiding site as an authorized user and permits the access to the travel-guiding site if a result of the authentication indicates that the user is an authorized user.

Figure 8:
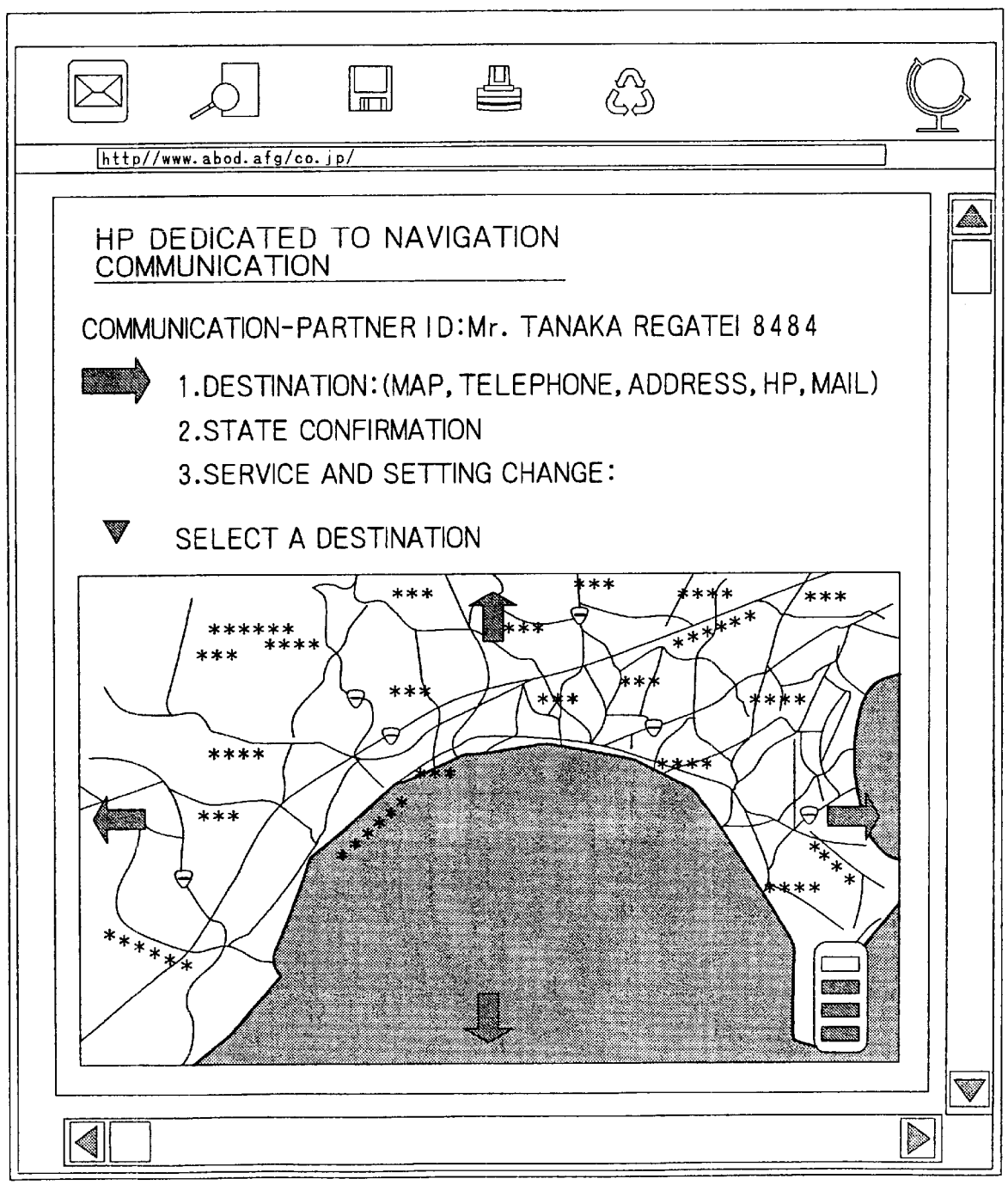
FIG. 8 is an explanatory diagram showing a typical display format of a first page of a web page presented by the service server.

When such an access is permitted, the travel-guiding site's top page (or first page) shown in FIG. 8 appears on the display screen of the display monitor 607. The first page shown in the figure shows 3 select items, namely, 1: Travel destination, 2: State confirmation and 3: Change of setting and others. If the user carries out a click operation to select the first select item "1: Travel destination," the user is allowed to set a travel destination. A map shown on the lower approximately-half side of the screen is used for setting a travel destination. It should be noted that a travel destination can be set by pointing to a location on the map displayed as shown in the figure. As an alternative, the user can also enter predetermined information identifying the travel destination. Examples of such information are an address, a telephone number and a pair of a latitude and a longitude. Such information is used in a search for the travel destination.

Figure 9:
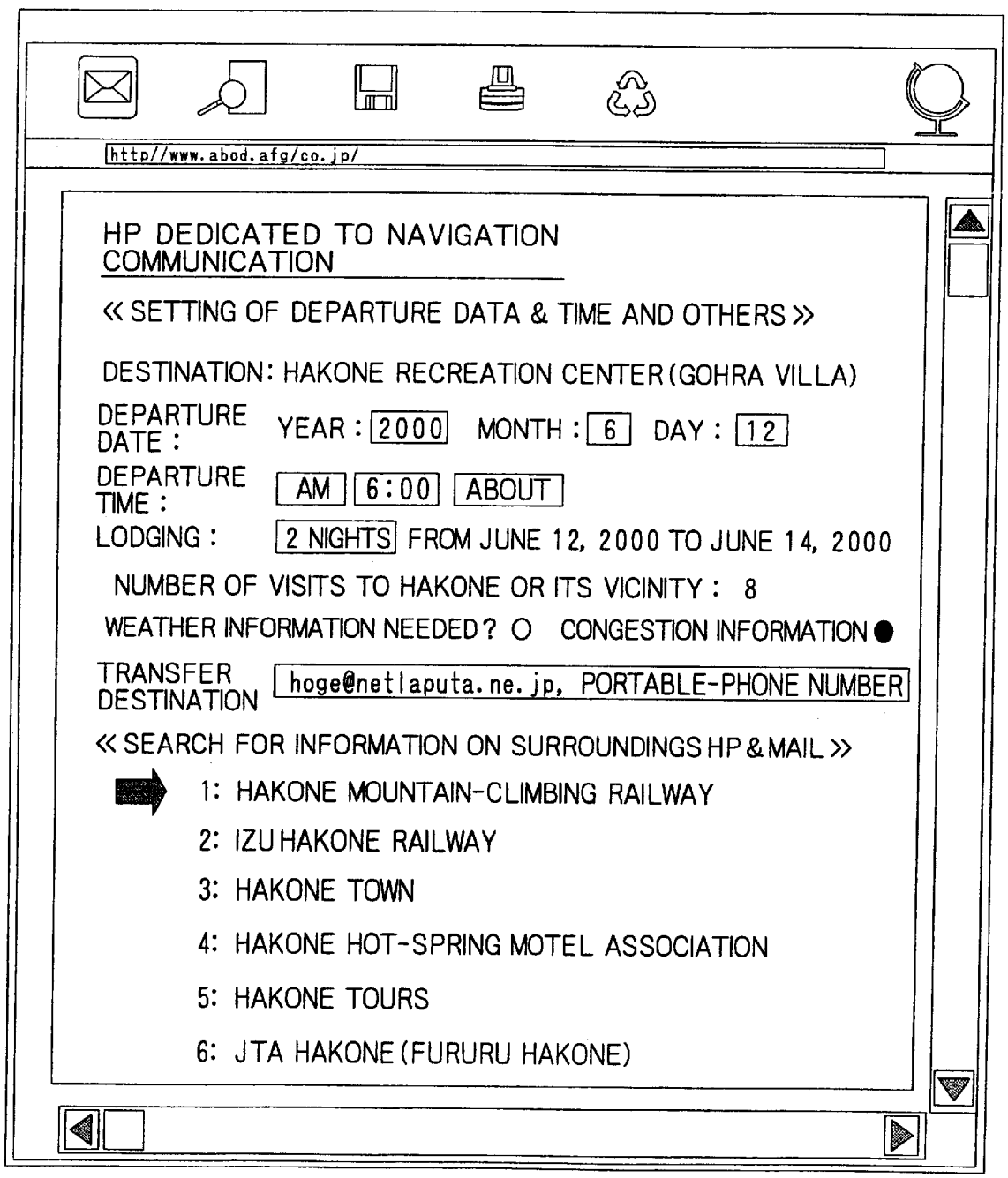
FIG. 9 is an explanatory diagram showing a typical display format of a second page of the web page presented by the service server.

When the setting of necessary items such as a travel destination on the first page shown in FIG. 8 has been completed, an access to the second page can then be made. A typical format of the second page is shown in FIG. 9. The second page shown in FIG. 9 is a screen to enter information to be transmitted to the navigation system 1 and the portable telephone 200, that is, information to be used for creating a navigation user file and a portable-telephone user file which pertain to the user file 513a.

As shown in the figure, the user can carry out operations to enter a departure date of the travel, a departure time of the travel and the number of lodging nights. The entered information is used for generating information for identifying a departure date of the travel, a departure time of the travel and a period of the travel as a user file.

In addition, as information stored in the user file 513a, a so-called radio button can be clicked to select whether or not information on the weather is to be acquired and to select whether or not traffic information such as information on congestion is to be acquired.

In addition, a "transmission-destination" item is a string of characters having a predetermined format to represent a mail address or a string of numerical characters representing a "portable telephone". As a service rendered by this embodiment, a user file 213a is always transmitted to the navigation system 1. In addition to the navigation system 1, however, the user file 213a can also be transmitted to an electronic-mail terminal or a portable telephone, which are owned by the user. In this case, the item for entering a "transmission destination" is used for specifying a terminal or the like as a recipient of a user file 213a in addition to the navigation system 1.

On the lower side of the second page shown in FIG. 9, a display area with a title of <<Search for information on surroundings HP & mail>> is provided. The display area shows a link page relevant to the travel destination specified on the first page. The link page associated with this service exists typically in the content data 512. The content data 512 can be searched for a link page for a specified travel destination. Then, when an access is made to the second page, the link page found in such a search is included in the second page prior to the transmission of the second page to the user terminal 600. To be more specific, URLs are included in the second page as the link page.

For example, assume that the user carries out an operation to click an item selected from the link page. In this case, it is possible to provide a configuration wherein the screen jumps directly to a web page specified by the click operation. A typical web page serving as a destination of such a jump is shown in FIG. 10.

Figure 10:
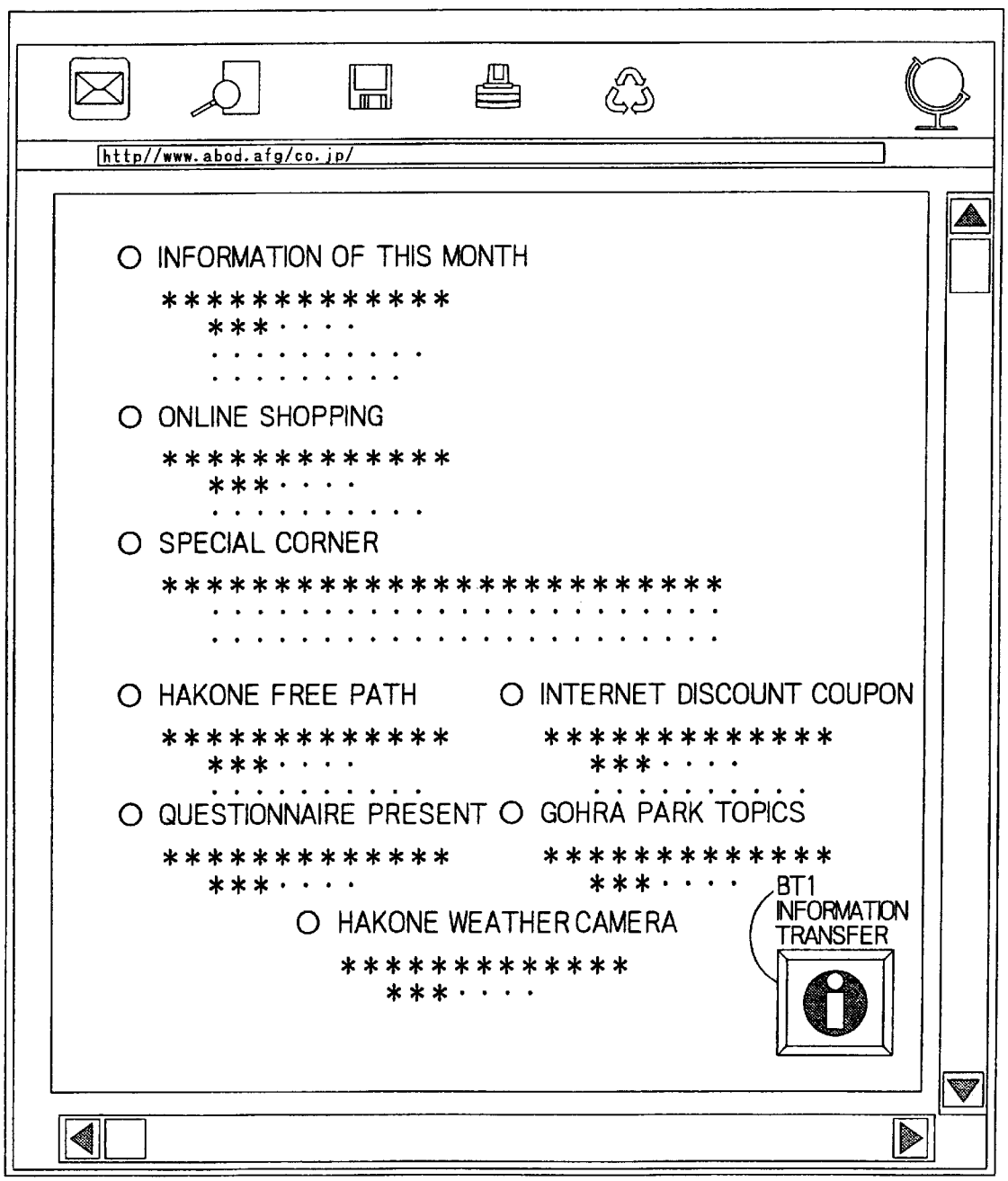
FIG. 10 is an explanatory diagram showing a typical display format of a page linked to the web page presented by the service server.

As shown in FIG. 10, the web page serving as a link destination shows typically information on events happening in vicinities of the travel destination, a variety of sightseeing facilities, traffic guidance, a variety of lodging facilities, reception of Internet reservations, other kinds of guidance and services. By viewing the web page of the link destination, the user is capable of obtaining information on vicinities of the travel destination. When a reservation contract is made, reservation-status information showing a reservation state is transmitted from the web page of the link destination to the service server 500. The service server 500 also processes the reservation-status information as data of the user file 213a.

An information-transfer button BT1 is shown on the right lower corner of the web page serving as a link destination. If an operation to click this information-transfer button BT1 is carried out, for example, information displayed on the web page of the link destination is eventually transmitted to the navigation system 1 and the portable telephone 200, which are owned by the user. Thus, if the user desires to transmit the information of the web page being viewed to the navigation system 1 and the portable telephone 200 because the user thinks that the information will be required also on the travel days, the user needs merely to operate the information-transfer button BT1.

Figure 11:
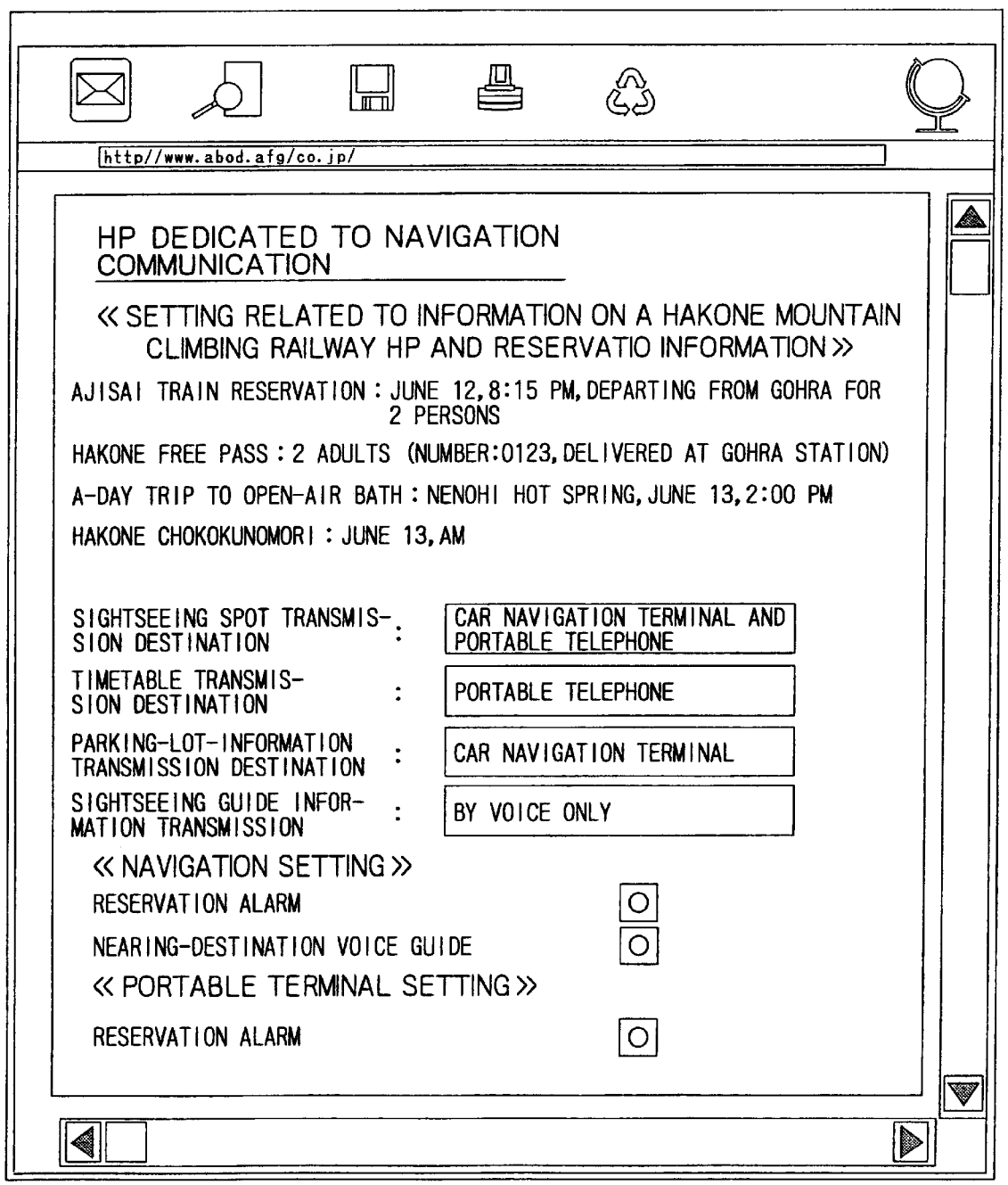
FIG. 11 is an explanatory diagram showing a typical display format of a third page of the web page presented by the service server.

After the web page of the link destination is displayed to allow the user to collect various kinds of information and/or to make a variety of reservations, the display screen is restored to the site of the service server 500 to display typically a third page shown in FIG. 11. The third page shows a result of organized collection of information transmitted by the user by operating the information-transfer button BT1 and services to make a variety of contracts in the service server 500. By viewing this third page, the user is capable of grasping information collected thereby and contracts made thereby so far.

This third page allows the user to carry out an operation to specify a transmission destination for each piece of information which should be transmitted to the destination by the operation to click the information-transfer button BT1 described earlier. In the case of the third page shown in this figure, for example, the navigation system 1 and the portable telephone 200 are each specified as a transmission destination of information on sightseeing spots. The portable telephone 200 is also specified as a transmission destination of information on a time table. The navigation system 1 is also specified as a transmission destination of information on parking lots. The information on sightseeing spots to be transmitted to the navigation system 1 and the portable telephone 200 is specified as a voice only not including a picture. Also on this page, for the navigation system 1 and the portable telephone 200, a reservation alarm and a nearing-destination voice guide or the like can also be set.

Figure 12:
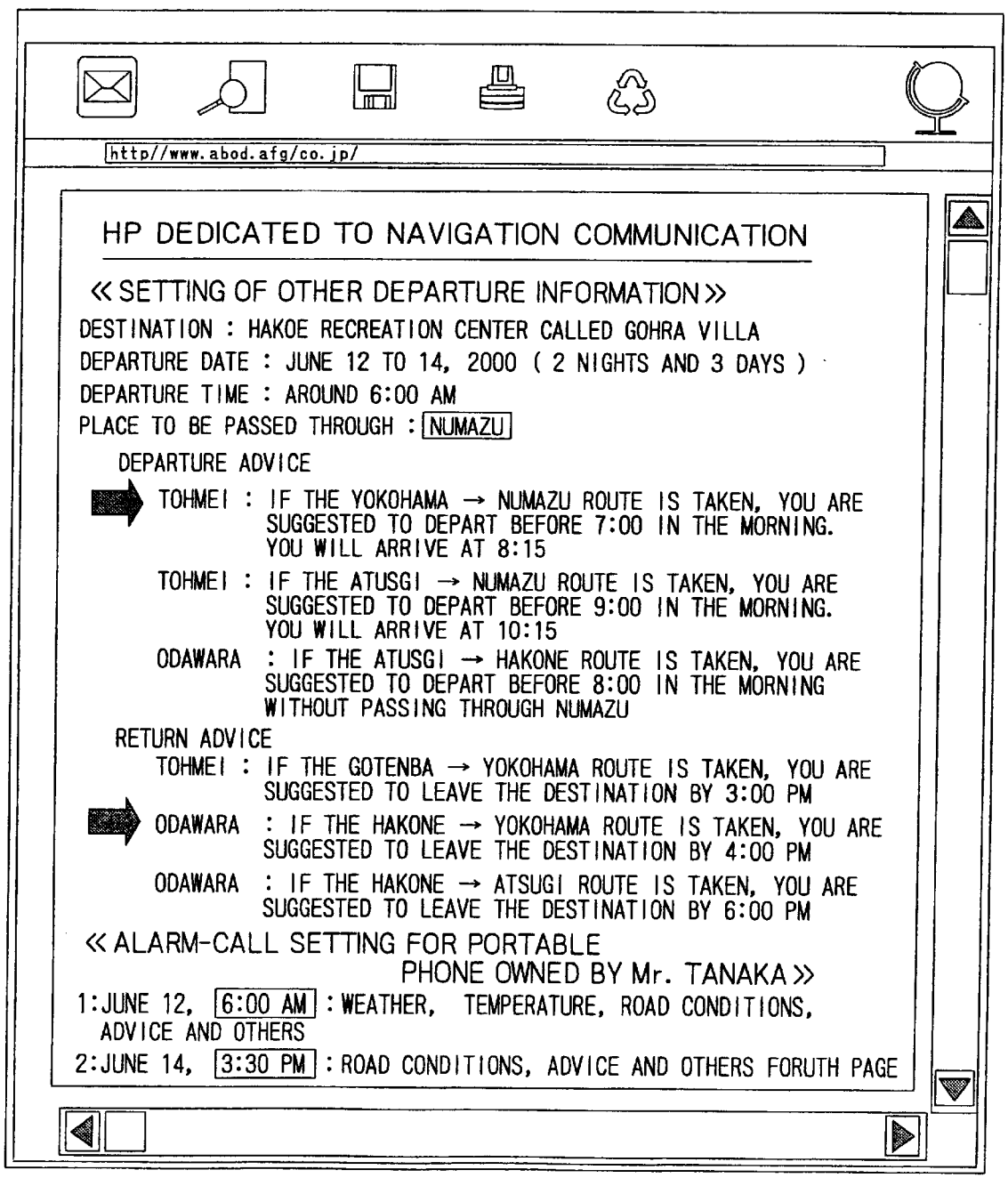
FIG. 12 is an explanatory diagram showing a typical display format of a fourth page of the web page presented by the service server.

After setting and other operations for the third page shown in FIG. 11 are completed, an access to typically a fourth page shown in FIG. 12 can be made. The fourth page shows various kinds of advice on a travel planned by the user in accordance with, among others, various kinds of information collected by the user, past information stored typically in the service server 500 and the present circumstance grasped in the service server 500. The page allows the user to enter a travel destination, a departure date, a departure time and a place to be passed through. In addition, the page displays a time table showing suggested departure times and return times. In addition, the page also allows the user to set an alarm call for the portable telephone 200.

Figure 13:
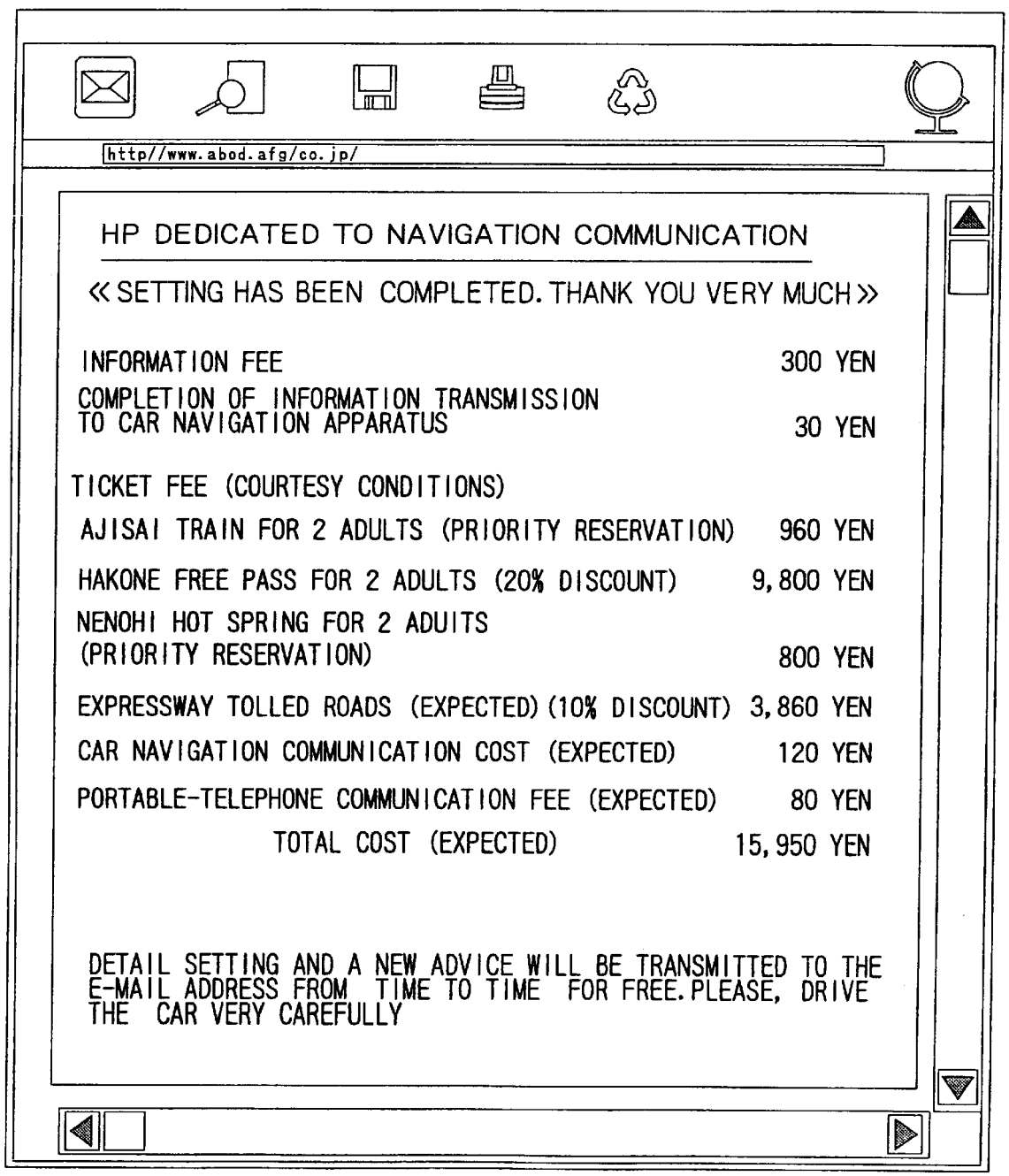
FIG. 13 is an explanatory diagram showing a typical display format of a fifth page of the web page presented by the service server.

A fifth page shown in FIG. 13 is typically the last page of the site of the service server 500. The last page serves as a screen for confirming data set by carrying out a variety of operations described so far, and shows fees or charges to be borne by the user. It should be noted that, after the screen shown in the figure, an access can typically be made to a page for settling the fees and charges shown in the fifth page.

As has been described above, the user is capable of setting a variety of travel items by using the user terminal 600 prior to a travel. The travel items set in this way are reflected in the navigation system 1 and the portable telephone 200.

Setting results produced by a user by using the user terminal 600 as described above are used by the service server 500 to create or edit the user file 513a for the user and managed by using the user file 513a. As described earlier by referring to FIG. 7, the user file 513a comprises two files, namely, a navigation user file and a portable-telephone user file. The navigation user file includes various kinds of information selected as pieces of information to be transmitted to the navigation system 1. By the same token, the portable-telephone user file includes various kinds of information selected as pieces of information to be transmitted to the portable telephone 200. A piece of information to be transmitted may include information on time at which the piece of information is to be transmitted. An example of information including information on time is an alarm call.

Information is transmitted from the service server 500 to the navigation system 1 as a navigation user file by way of the Internet 400 and the radio-telephone-communication network 300 to be received by the communication terminal 50 employed in the navigation system 1. The navigation user file is transmitted ahead of the departure time on the departure date by a predetermined period of time which is typically one hour. When the user navigation file is received by the communication terminal 50 employed in the navigation system 1, the main power supply of the navigation main unit 2 is turned on to allow the received navigation user file to be stored therein. Then, the following operations are carried out automatically.

The navigation user file includes at least information on a travel destination. The measurement unit 4 determines the present position of the car 100. Then, the navigation system 1 carries out processing to search a map for a route between the present position of the car 100 and the travel destination. Data obtained as a result of the search is stored. When the user has desired to acquire traffic information such as information on traffic congestion by operating the user terminal 600, for example, this desire is included in the navigation user file. In this case, the navigation system 1 acquires the information on traffic received by the traffic-information-receiving antenna 7.

In this way, the navigation system 1 implemented by the embodiment is capable of carrying out at least operations to search a map for a route between the present position of the car 100 and the travel destination and to gather information on traffic until the user gets into the car 100 at a departure time as described above. By carrying out such operations, the route found in the search is displayed when the user gets into the car 100 at a departure time. In addition, it is also possible to grasp at least a traffic condition in the vicinity as a state of traffic congestion or the like. That is to say, in this embodiment, it is possible to prepare information required at the departure time in the navigation system 1. In other words, when the user gets into the car 100 in a hurry at the departure time, it is not necessary for the user to carry out preparatory operations on the navigation system 1 mounted on the car 100.

In addition, in the embodiment, when a time specified in advance is due or the car 100 reaches a specified position in the course of the travel, a guide picture and/or a speech which are based on data stored in the navigation user file can be properly output.

By the same token, the service server 500 transmits the portable-telephone user file to the portable telephone 200 by way of the Internet 400 and the radio-telephone-communication network 300. The portable telephone 200 is thus capable of outputting a variety of alarm calls or the like at times set in advance by the user. In addition, an electronic mail such as guide information can be transmitted to the portable telephone 200 at a predetermined time specified by the user in advance. The user can then open the electronic mail which is useful for the travel.

3: Typical Processing

Figure 14:
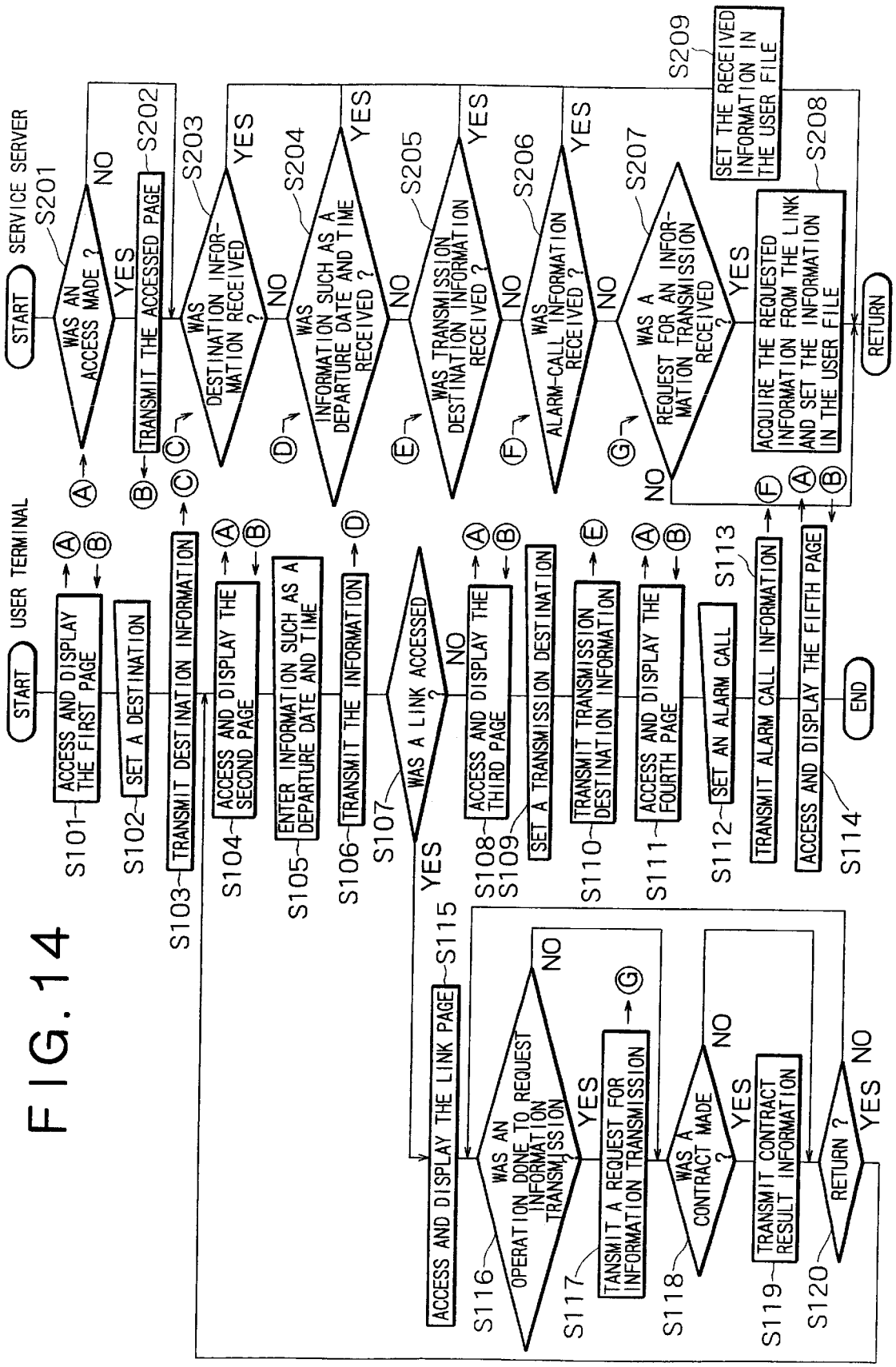
FIG. 14 is a flowchart representing processing carried out by the user terminal and the service server for implementing an operation set by using the user terminal.

FIG. 14 shows flowcharts representing pieces of processing carried out by the user terminal 600 and the service server 500 in accordance with various kinds of setting done by operating the user terminal 600 as described earlier by referring to FIGS. 8, 9, 10, 11, 12 and 13. In the pieces of processing shown in the figures, the service server 500 creates a user file based on data set by carrying out a variety of operations after an access made by the user terminal 600 to the service server 500. The processing in the user terminal 600 is carried out by a CPU 601 with the user terminal 600 connected to the Internet 400 and with application software invoked. The application software is the so-called Internet browser. On the other hand, the processing in the service server 500 is carried out by the control unit 503. Notations A to G each enclosed in a circle indicates information exchanged between the user terminal 600 and the service server 500, and indicates a relation between processing steps in the processing of the user terminal 600 and the processing of the service server 500.

The processing in the user terminal 600 begins with a step S101 at which an access to the first page of a web site of the service server 500 is made by the user by carrying out an operation on the user terminal 600. At a step 201, the service server 500 is waiting for a request for an access to the web site to be made through the Internet 400. As a request for an access is received, the flow of the processing goes on to a step S202 at which a content of a page being accessed is transmitted to the user terminal 600. Thus, when the user terminal 600 makes an access to the first page at the step S101, the control unit 503 employed in the service server 500 carries out the pieces of processing at the steps S201 and S202 to read out the content as the first page from the storage unit 501 and transmit the content to the user terminal 600. At the step S101, the content of the first page received from the service server 500 is received and displayed as a browser screen as shown in FIG. B. As described earlier, however, when the access to the first page is made, the service server 500 authenticates the user by using a user ID and a password, which are entered by the user by carrying out input operations and then transmitted by the user terminal 600 to the service server 500.

When the browser screen of the first page is displayed, at a step S102, the user sets a travel destination by carrying out an operation on the user terminal 600. Then, at the next step S103, the user further carries out a predetermined operation to transmit the set travel destination to the service server 500.

Subsequently, at the next step S104, the user further carries out a predetermined operation on the user terminal 600 to make an access to the second page. As a result, the second page shown in FIG. 9 is displayed on the browser screen. It should be noted that, also in this case, the control unit 503 employed in the service server 500 carries out the pieces of processing at the steps S201 and S202 to read out the content as the second page from the storage unit 501 and transmit the content to the user terminal 600. The same processing is carried out at steps S108, S111 and S114 to make an access to the third, fourth and fifth pages respectively and display them as will be described later.

With the second page displayed, the user is allowed to carry out an operation to enter information such as a departure date and a departure time to entries on the second page in processing carried out at the next step S105. Then, at the next step S106, the entered pieces of information are transmitted to the service server 500.

With the second page displayed, the flow of the processing then goes on to a step S107 to form a judgment as to whether or not an operation has been carried out to make an access to a link page. If an operation has been carried out to make an access to a link page, the flow of the processing goes on to a step S115.

At the step S115, an access is made to a link page specified by the operation. A content of the link page is then received from a server providing the link page. Then, processing is carried out to display a screen like one shown in FIG. 10. The flow of the processing then goes on to a step S116 to form a judgment as to whether or not an operation to click the information-transfer button BT1 has been carried out. If an operation to click the information-transfer button BT1 has not been carried out, the flow of the processing goes on to a step S118. If an operation to click the information-transfer button BT1 has been carried out, on the other hand, the flow of the processing goes on to a step S117. At the step S117, processing is carried out to transmit a request for a transmission of information. It should be noted that the request for a transmission of information is transmitted to the service server 500.

Then, the flow of the processing goes on to a step S118 to form a judgment as to whether or not an operation has been carried out to make a contract for reserving a ticket, an event and/or a sightseeing spot. If no operation has been carried out to make such a contract, the flow of the processing goes on to a step S120. If an operation has been carried out to make such a contract, on the other hand, the flow of the processing goes on to a step S119. At the step S119, information on a reservation result is transmitted to the service server 500. It should be noted that, in actuality, the processing of the step S119 is carried out by transmitting the reservation result from the server of the link page to the service server 500 along with information used by the service server 500 to identify the user instead of transmitting the reservation result from the user terminal 600 to the service server 500. An example of the information used by the service server 500 to identify the user is a user ID.

Then, the flow of the processing goes on to a step S120 to form a judgment as to whether or not an operation has been carried out to return to the site of the service server 500. If no operation has been carried out to return to the site of the service server 500, the flow of the processing goes back to the step 116. That is to say, the state of displaying the same page is maintained. If the outcome of the judgment formed at the step S120 indicates that an operation has been carried out to return to the site of the service server 500, on the other hand, the flow of the processing goes back to the step 104 at which the second page is displayed again.

If the outcome of the judgment formed at the step S107 indicates that no operation has been carried out to make an access to a link page, on the other hand, the flow of the processing goes on to a step 108 and subsequent steps. At the step S108, the user carries out an operation to make an access to the third page in order to display the browser screen shown in FIG. 11. At steps S109 and S110, the user carries out operations to set a transmission destination and an alarm or the like on the third page. Then, the user transmits information on the transmission destination and the alarm setting or the like to the service server 500.

Subsequently, at the next step S111, the user carries out the same operation to make an access to the fourth page, receive and display the page. Then, while the fourth page is being displayed, at steps S112 and S113, the user carries out operations to set an alarm call and transmit information on the set alarm call. It should be noted that, by using the fourth page shown in this figure, the user is capable of entering a place to be passed through or the like by operating the user terminal 600 and transmitting the information to the service server 500. In accordance with information received from the user terminal 600, the service server 500 searches for departure and return time schedules and creates a content allowing to display the schedules as parts of the fourth page. This processing is not shown in the figure though.

Processing is carried out by the service server 500 in accordance with processing carried out by the user terminal 600 as follows. The pieces of processing carried out by the service server 500 at the steps S201 and S202 were described above. At the step S202, however, if information set in the user file in processes carried out so far to create the user file includes data that needs to be reflected on the web page to be transmitted to the user terminal 600, the data required for creation of the web page is read out from the present user file to be used in creation of a content serving as the web page. The data required for creation of the web page is basically information set by operations carried out by the user. Then, the content is transmitted to the user terminal 600.

The flow of the processing then goes on to a step S203 to form a judgment as to whether or not travel-destination information transmitted by the user terminal 600 at the step S103 has been received. If information on a travel destination has been received, the flow of the processing goes on to a step S209 at which the information on a travel destination is recorded in a user file associated with a user ID assigned to the user. If information on a travel destination has not been received, on the other hand, the flow of the processing goes on to a step S204 to form a judgment as to whether or not information on a departure data, a departure time and the like has been received from the user terminal 600 transmitting the information at the step S106. If such information has been received, the flow of the processing goes on to the step S209 at which the information on a departure data, a departure time and the like is recorded in the same user file.

If the information on a departure data, a departure time and the like has not been received, on the other hand, the flow of the processing then goes on to a step S205 to form a judgment as to whether or not transmission-destination information transmitted by the user terminal 600 at the step S110 has been received. If information on a transmission destination has been received, the flow of the processing goes on to the step S209 at which the information on a transmission destination is recorded in the same user file.

If the information on a transmission destination has not been received, on the other hand, the flow of the processing then goes on to a step S206 to form a judgment as to whether or not alarm-call information transmitted by the user terminal 600 at the step S112 has been received. If information on an alarm call has been received, the flow of the processing goes on to the step S209 at which the information on an alarm call is recorded in the same user file.

If information on an alarm call has not been received, on the other hand, the flow of the processing then goes on to a step S207 to form a judgment as to whether or not a request for a transmission of information has been received from the user terminal 600 transmitting the request at the step S117. If a request for a transmission of information has been received, the flow of the processing goes on to the step S208 at which an access to a link server is made to acquire the requested information. The acquired information is recorded in the same user file. As described above, various kinds of received information are recorded in a user file, being properly arranged to give a single user file by execution of necessary data processing.

As described earlier by referring to FIG. 7, the created user file physically comprises typically a navigation user file and a portable-phone user file. The service server 500 typically sets a time preceding the departure time recorded in the user file by a predetermined period of time as a transmission time. The service server 500 then transmits the navigation user file to the navigation system 1 by way of the Internet 400 and the radio-telephone-communication network 300 at a timing determined by the transmission time. At that time, the service server 500 specifies a navigation ID corresponding to the user ID and includes the navigation ID in the transmitted navigation user file. The navigation ID typically represents a telephone number of the communication terminal 50. The application server 303 employed in the radio-telephone-communication network 300 receiving the navigation user file including the navigation ID passes on the file to the telephone number. In this way, information can be transmitted to a specific navigation system 1.

The navigation system 1 analyzes the navigation user file received from the service server 500 and carries out processing according to a result of the analysis as will be described later. As a result, prior to the departure time, the navigation system 1 is capable of automatically carrying out preparatory processing which would otherwise have to be done by the user as a preparation before the departure. As described earlier, the preparatory processing includes a search of a map for a route and acquisition of information on traffic.

In addition, the service server 500 also transmits various kinds of guide information and a command to generate an alarm call to the portable telephone 200 in a proper manner and at required times on the basis of information requesting a transmission of the guide information and specification information such as the alarm call. The information requesting a transmission of the guide information and the specification information is stored in the portable-telephone user file.

Then, on the basis of the navigation user file received before the departure time, the navigation system 1 automatically carries out processing as automatic preparatory operations which are represented by a flowchart shown in FIG. 15. To be more specific, the processing represented by the flowchart shown in the figure is carried out by the control unit 19 employed in the navigation main unit 2. When the processing represented by the flowchart shown in the figure is started, the main power supply of the navigation main unit 2 is in an off state. In this state, only specific circuits including a CPU forming the control unit 19 are in a state of being ready to operate due to power provided by a standby power supply. The communication terminal 50 is driven by typically a battery to operate normally. At the start of the processing, the terminal is in a wait state.

The processing represented by the flowchart shown in the figure begins with a step S301 at which the communication terminal 50 is in a state of waiting for a navigation user file. As the navigation user file is received, the flow of the processing goes on to a step S302 at which the main power supply is turned on to put the navigation system 1 in a state of being enabled to operate. Then, at the next step S303, the navigation main unit 2 inputs the navigation user file received by the communication terminal 50 through the measurement unit 47 and writes the file into the memory 12 for storing the file. Subsequently, at the next step S304, the departure data and the departure time included in the navigation user file stored in the memory 12 are referenced. Then, at the next step S305, an automatic-processing start time is set. Subsequently, at the next step S306, the main power supply is turned off. Then, the flow of the processing goes on to a step S307 to enter a state of waiting for the present time measured by the unit 15 to reach the automatic-processing start time set at the step S305.

As described above, for example, the service server 500 executes time management with a high degree of accuracy and transmits the user file to the navigation system 1 at a time preceding the departure time by a predetermined period. In this case, as soon as the user file is received by the navigation system 1, the navigation system 1 may carry out pieces of processing at a step S308 and subsequent steps immediately. It is assumed, however, that the service server 500 does not execute time management with such a high degree of accuracy. In this case, the pieces of processing at the steps S304 to S307 need to be carried out. To put it in detail, due to the inaccuracy of the time management, the service server 500 may have transmitted the navigation user file long before the departure time. Traffic information included in such a navigation user file may become obsolete at the departure time. Thus, it is desirable to carry out the automatic processing to be described below prior to the departure time at a time that is as close as possible to the departure time. For example, the automatic processing is carried out about one hour before the departure time. The pieces of processing at the steps S304 to S307 are carried out so that the automatic processing can be performed at such a time preceding the departure time.

As the outcome of the judgment formed at the step S307 indicates that the present time measured by the unit 15 reaches the automatic-processing start time set at the step S305, the flow of the processing goes on to the step S308. At the step S308, control is executed to again turn on the main power supply. Then, at the next step S309, travel-destination information included in the navigation user file stored in the memory 12 is referenced. The information on a travel destination is information on a position on a map which can be processed by the navigation system 1. The information on a travel destination is expressed in terms of a longitude and a latitude. Subsequently, at the next step S310, information on the present position is acquired. At the present time, the present position is typically determined by the measurement unit 4 from a received GPS electric wave. Thus, the information on the present position is produced by the measurement unit 4. If the GPS electric wave cannot be received so that the measurement unit 4 is not capable of determining the present position, however, the last halted-car position stored in the navigation system 1 is typically used as the present position.

Then, at the next step S311, processing to search for a route from the present position to the travel destination is carried out on the basis of the acquired information on the travel destination described above and the information on the present position. Information on a route from the present position to the travel destination is obtained as a result of the processing to search for the route and stored in the memory 12. Then, when the car 100 is actually driven to the travel destination, necessary control is executed to give the driver guidance according to the route information stored in the memory 12.

Subsequently, at the next step S312, current road-traffic information received by the traffic-information-receiving antenna 7, if any, is input. Then, at the next step S313, the received information on road traffic is stored in the memory 12. By the same token, when the car 100 is actually driven to the travel destination, necessary control is executed to give the driver guidance according to the road-traffic information stored in the memory 12. It should be noted that, instead of acquiring the information on road traffic at the step S312, such information can also be acquired prior to the steps S309 to S311 at which a route is searched for. In this case, the search for a route can be based on the information on road traffic. For example, the search is conducted to find a route that does not include a closed road or a congested road. Such a route is practically desirable.

In accordance with the processing represented by the flowchart shown in the figure, after the processing of the step S313, the navigation system 1 enters a wait state with the main power supply put in an on state as it is. Since the searched information on a route and the information on road traffic have been stored in the memory 12, however, the navigation system 1 may be put in a wait state with the main power supply put in an off state after the processing of the step S313. In this case, the main power supply of the navigation system 1 is again turned on when the engine is started by the user getting into the car 100 at the departure time. When the main power supply is turned on, the already searched information on a route and the already acquired information on the road traffic are presented to the user.

It should be noted that the scope of the present invention is not limited to details of the embodiment described above. For example, items that can be set by making an access to the service server 500 from the user terminal 600 are not limited to pieces of information described earlier by referring to FIGS. 8, 9, 10, 11, 12 and 13. Thus, the structure of the user file can be changed accordingly. In addition, the navigation system 1 and the portable telephone 200 are capable of implementing a variety of possible operations based on respectively the navigation user file and the portable-telephone user file, which are received from the service server 500.

As described above, in accordance with the present invention, a service server generates a user file to be used as control information according to operations carried out by the user on typically a user terminal connected to the service server. Then, the user file is transmitted to a navigation apparatus which carries out predetermined operations based on the user file received from the service server. Typically, the user terminal is installed at the home of the user or at a location far away from a movable body on which the navigation apparatus is mounted. The user carries out operations on the user terminal to set various kinds of data. Then, the set data is used for remotely controlling the navigation apparatus. By remotely controlling the navigation apparatus in this way, it is no longer necessary for the user, for example, to take the trouble to go to the movable body in order to carry out required operations on the navigation apparatus mounted on the movable body. As a result, the convenience is improved.

In the configuration described above, typically, the service server transmits a user file at a predetermined time preceding a time indicated by the user file's date and time information showing a departure date, a departure time and the like. As an alternative, the navigation apparatus carries out automatic processing at a predetermined time preceding a time indicated by the user file's date and time information showing a departure date, a departure time and the like. In such a configuration, the navigation apparatus thus carries out automatic processing at a proper timing typically before the user utilizes a movable body on which the navigation apparatus is mounted. As a result, information useful in a real-time manner can be presented to the user traveling by driving the movable body such as a car.

In addition, the present invention allows the automatic processing and a search for a route to be carried out. Prior to the present invention, in order to search for a route and to acquire information on traffic, for example, the user carries out an operation to operate the navigation apparatus after the user gets into the movable body such as a car. In the case of the present invention, on the other hand, the operation is completed before the user gets into the movable body. Thus, the time to carry out the operation on the movable body can be eliminated. As a result, it is possible to provide the user using the navigation apparatus with improved convenience.

While a preferred embodiment of the invention has been described using specific terms, such description is for illustrative purposes only, and it is to be understood that changes and variations may be made without departing from the spirit or scope of the following claims.

What is claimed is:

1. A service-rendering system for transmitting control data to a first apparatus provided on a movable body, said control data used for controlling operations of said first apparatus located at a location separate from said service-rendering system, said service-rendering system comprising:

a service-rendering apparatus for generating said control data for controlling operations of said first apparatus and for transmitting said generated control data to said first apparatus using a radio transmission apparatus connected to a network for transmitting data to said first apparatus;

a terminal connected to said service-rendering apparatus through said network for transmitting data to said service-rendering apparatus, said data to be used by said service-rendering apparatus for generating said control data;

a communication apparatus connected to said service-rendering apparatus through said network for transmitting said control data received from said service-rendering apparatus to said first apparatus by radio transmission; and a control apparatus provided on said movable body, connected to said communication apparatus by radio communication, for receiving said control data from said radio transmission apparatus and for controlling said first apparatus.

2. The service-rendering system according to claim 1, wherein said service-rendering apparatus comprises:

communication means for communicating with said terminal and with said communication apparatus through said network;

data storage means for storing service data to be transmitted to said terminal connected through said network when said terminal requests a rendering of a service;

authentication-data storage means for storing authentication data used for judging whether said terminal connected to said service-rendering apparatus through said network is entitled to said rendering of said service;

control-data storage means for storing said control data generated for a terminal entitled to said rendering of said service; and control means for: judging whether said terminal is entitled to said rendering of said service based upon said authentication data stored in said authentication-data storage means and authentication request data for a service-rendering request received by said communication means; transmitting data stored in said data storage means to said terminal entitled to said rendering of said service; storing control data in said control-data storage means by classifying said control data by terminal based upon data received from said terminal to be used for generating said control data; and controlling said communication means to transmit said control data stored in said control-data storage means to said control apparatus associated with said terminal.

3. The service-rendering system according to claim 1, wherein said control apparatus comprises: radio communication means for communicating by radio with said communication apparatus; storage means for storing said control data received by said radio communication means; power-supply control means for controlling a power supply of said first apparatus; and said control means for: controlling said storage means to store said control data received by said radio communication means; controlling said power-supply control means to turn on said power supply of said first apparatus; and for controlling said first apparatus based upon said control data.

4. A navigation apparatus mounted on a movable body for setting a navigation operation based on control data received from a service-rendering apparatus, said navigation apparatus comprising:

radio communication means for communicating by radio communication and for receiving said control data;

storage means for storing said control data received by said radio communication means;

power-supply control means for controlling a power supply of said navigation apparatus;

time-measuring means for measuring a length of time;

navigation-information-generating means for generating navigation information; and control means for: controlling said storage means to store said control data received by said radio communication means; controlling said power-supply control means to turn on and turn off said power supply of said navigation apparatus based upon said control data and said time measured by said time-measuring means; and for controlling said navigation-information-generating means to generate said navigation information based on said control data.

5. The navigation apparatus according to claim 4, further comprising reception means for receiving traffic data transmitted by radio communication, wherein said navigation-information-generating means generates said navigation information based on said traffic data received by said reception means.

6. The navigation apparatus according to claim 4, wherein said control means executes control to start generation of said navigation information at a time preceding a departure time by a predetermined length of time based on said departure time included in said control data and said time measured by said time measuring means.

7. The navigation apparatus according to claim 6, wherein said power supply is turned off upon completion of said generation of said navigation information at a time preceding said departure time by said predetermined time until said power supply is turned on.

8. A service-rendering apparatus having a radio communication function for generating control data for controlling a navigation apparatus installed on a movable body and for transmitting said control data to said navigation apparatus, said service-rendering apparatus comprising:

communication means for communicating with a radio communication apparatus to transmit said control data to said navigation apparatus by radio transmission and for communicating with a terminal operated by a user through a network;

authentication-data storage means for storing authentication data for authenticating an ID code received from said terminal by associating said authentication data with one of a plurality of navigation-apparatus IDs identifying said navigation apparatus;

content-generation-data storage means for storing content generation data that is used for generating content transmitted to said terminal and that is used for requesting said user to enter a command to generate said control data;

control-data storage means for storing control data for each of said plurality of navigation-apparatus IDs; and control means for controlling: said authentication of said ID code received by said communication means from said terminal by comparing said ID code with said authentication data stored in said authentication-data storage means and judging whether to establish communication with said terminal; said generation of said content based on said content generation data stored in said content-generation-data storage means for said terminal with said authenticated ID code; transmission of said generated content to said terminal with said authenticated ID code; generation of said control data based on a command received by said communication means from said terminal with said authenticated ID code and storage of said generated control data in said control-data storage means by associating said control data with one of said plurality of navigation-apparatus IDs associated with said ID code of said terminal stored in said authentication-data storage means; and driving said radio communication apparatus to transmit said control data to said navigation apparatus identified by said navigation-apparatus ID associated with said control data in said control-data storage means.

9. The service-rendering apparatus according to claim 8, wherein said control means controls'said communication means to receive predetermined data from an other service-rendering apparatus connected to said network when a request is made by said authenticated terminal to receive said predetermined data presented as a service rendered by said other service-rendering apparatus.

10. The service-rendering apparatus according to claim 8, further comprising a time-measuring means for generating time data, wherein said service-rendering apparatus transmits said control data stored in said control-data storage apparatus to a predetermined navigation apparatus at a predetermined time based on said time data generated by said time-measuring means.

11. The service-rendering apparatus according to claim 10, wherein said service-rendering apparatus transmits said control data to said predetermined navigation apparatus at a time preceding a navigation start time included in said control data by a predetermined length of time.

12. The service-rendering apparatus according to claim 8, wherein said content transmitted to said terminal is map data.

13. The service-rendering apparatus according to claim 8, further comprising an electronic-mail-transmitting means, wherein said control means controls said electronic-mail-transmitting means to generate an electronic mail containing predetermined data based on said control data and controls said communication means to transmit said electronic mail to a predetermined mail address at a predetermined time based on said control data.

14. A navigation apparatus provided on a movable body that communicates with a service-rendering apparatus generating control data for navigating said movable body when a request is made by a user operating a terminal, said navigation apparatus comprising:

radio communication means for receiving said control data generated by said service-rendering apparatus and transmitted by a radio communication apparatus;

storage means for storing said control data received by said radio communication means;

playback means for playing geographical data for navigation from a recording medium storing said geographical data;

measurement means for measuring a present position of said movable body;

display means for displaying a map based on said geographical data played by said playback means;

navigation-information-generating means for generating navigation information based on travel-destination data included in said control data, present-position data measured by said measurement means, and said geographical data played by said playback means; and control means for controlling said storage means to store said control data received by said radio communication means; for controlling said measurement means to measure said present position of said movable body; for controlling said playback means to play said geographical data based on said travel-destination data included in said control data and said present-position data measured by said measurement means; for controlling said navigation-information-generating means to generate said navigation information; and for controlling said display means to display said map generated based upon said reproduced geographical data and said generated navigation information.

15. The navigation apparatus according to claim 14, further comprising a navigation-information storage means for storing said navigation information generated by said navigation-information-generating means, wherein said control means executes control to store said navigation information in said navigation-information storage means.

16. The navigation apparatus according to claim 14, further comprising time-measuring means for generating time data, wherein said control means controls said navigation-information-generating means to generate said navigation information at a time preceding a navigation start time included in said control data by a time length based on said time data generated by said time-measuring means.

17. The navigation apparatus according to claim 14, further comprising a power-supply control means for controlling a main power supply of said navigation apparatus, wherein said control apparatus controls said power-supply control means to turn on said main power supply of said navigation apparatus when said navigation information is generated.

18. A method for controlling a navigation apparatus provided on a movable body that communicates with a service-rendering apparatus that generates control data used for navigating said movable body when a request is made by a user operating a terminal, said method comprising the steps of:

receiving said control data from said service-rendering apparatus;

storing said received control data in a storage means provided in said navigation apparatus;

measuring a present position of said movable body;

generating navigation information based on travel-destination data included in said control data and based on said present position; and displaying said generated navigation information on a display unit.

19. The method for controlling a navigation apparatus according to claim 18, wherein said navigation information is generated prior to a navigation start time included in said control data.

20. The method for controlling a navigation apparatus according to claim 18, wherein a main power supply of said navigation apparatus is turned on before said navigation information is generated.

21. The method for controlling a navigation apparatus according to claim 18, wherein said generated navigation information is stored.

22. A service-rendering method for generating control data for controlling one of a plurality of navigation apparatuses that is installed on a movable body and that is provided with a radio communication function and for transmitting said control data to said navigation apparatus, said service-rendering method comprising the steps of:

receiving an ID code transmitted by a terminal operated by a user;

authenticating said received ID code;

transmitting content to said terminal if said terminal is authenticated successfully as having a right to receive a service allowed by said authentication;

receiving a command from said authenticated terminal;

generating control data based on said received command; and transmitting said generated control data to said navigation apparatus associated with said ID code.

23. The service-rendering method according to claim 22, further comprising the step of receiving predetermined data from an other service-rendering apparatus when a request is made by said authenticated terminal to collect said predetermined data from said other service-rendering apparatus.

24. The service-rendering method according to claim 22, further comprising the step of storing said generated control data by classifying said control data according to said ID code.

25. The service-rendering method according to claim 24, wherein said stored control data is transmitted to a predetermined one of said plurality of navigation apparatuses at a predetermined time.

26. The service-rendering method according to claim 25, wherein said stored control data is transmitted to said predetermined navigation apparatus at a time preceding a navigation start time included in said control data by a predetermined length of time.

27. The service-rendering method according to claim 22, further comprising the step of transmitting an electronic mail including predetermined data to a predetermined mail address at a predetermined mail time based upon said control data.

28. A service-rendering system comprising:

one of a plurality of navigation apparatuses provided with a radio communication terminal function, installed on a movable body and identified by a unique apparatus ID from a plurality of apparatus IDs that is assigned to said navigation apparatus as an apparatus ID inherent to said navigation apparatus;

a service server provided with a service-rendering function and used for storing said plurality of apparatus IDs, each said apparatus ID assigned to one of said plurality of navigation apparatuses each said navigation apparatus capable of rendering a service;

a user terminal;

one of a plurality of communication networks enabling communication between said navigation apparatus and said service server and communication between said user terminal and said service server;

access means for allowing said user terminal to access said service server through said communication network;

control-data-generating means for generating control data for controlling operations of said navigation apparatus associated with said user terminal in accordance with an operation carried out on said user terminal accessing said service server and for requesting said service server to store said control data;

transmission means for transmitting said control data to one of said plurality of navigation apparatuses accessed by said service server by using said apparatus ID assigned to said navigation apparatus; and control means for controlling said navigation apparatus to perform a predetermined operation based on said received control data.

29. Then service-rendering system according to claim 28, wherein said control data is transmitted at a predetermined time prior to a time indicated by time data included in said control data.

30. A navigation apparatus mounted on a movable body, comprising:

communication means for enabling communication through a predetermined communication network with a service server storing control data generated in accordance with data transmitted through communication with a user terminal associated with said navigation apparatus; and control means for executing control to perform a predetermined operation based on said control data received by said communication means used for controlling said predetermined operation of said navigation apparatus.

31. The navigation apparatus according to claim 30, wherein said control means executes control to perform said predetermined operation at a predetermined time prior to a time indicated by time data included in said control data.

32. The navigation apparatus according to claim 30, wherein said control means executes a route search based on positional data included in said control data as said predetermined operation.

33. The navigation apparatus according to claim 30, further comprising a traffic-data-acquiring means for receiving and acquiring traffic data, wherein said control means is capable of controlling said traffic-data-acquiring means to acquire said traffic data as said predetermined operation.

* * * * *